United States Patent
Oh et al.

(10) Patent No.: US 9,703,780 B2
(45) Date of Patent: Jul. 11, 2017

(54) XDM SYSTEM AND METHOD FOR FORWARDING A DOCUMENT

(75) Inventors: Jae-Kwon Oh, Seoul (KR); Jeedigunta Venkateswar, Karnataka (IN); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 484 days.

(21) Appl. No.: 12/377,829

(22) PCT Filed: Aug. 16, 2007

(86) PCT No.: PCT/KR2007/003920
§ 371 (c)(1),
(2), (4) Date: Feb. 17, 2009

(87) PCT Pub. No.: WO2008/020720
PCT Pub. Date: Feb. 21, 2008

(65) Prior Publication Data
US 2010/0275115 A1 Oct. 28, 2010

(30) Foreign Application Priority Data
Aug. 16, 2006 (KR) .................. 10-2006-0077367

(51) Int. Cl.
*G06F 17/30* (2006.01)
(52) U.S. Cl.
CPC .............................. *G06F 17/30011* (2013.01)
(58) Field of Classification Search
CPC ........... G06F 17/2205; G06F 17/30528; G06F 17/2247; G06F 17/30011; G06F 17/30194
(Continued)

(56) References Cited

U.S. PATENT DOCUMENTS

2003/0051055 A1  3/2003  Parrella, Sr. et al.
2006/0140173 A1*  6/2006  Hoover .................. 370/352
(Continued)

FOREIGN PATENT DOCUMENTS

EP  1 768 038 A2  3/2007
JP  10-254752  9/1998
(Continued)

OTHER PUBLICATIONS

"XML Document Managament (XDM) Specification", Open Mobile Alliance (OMA), Jun. 28, 2005.*
(Continued)

*Primary Examiner* — Ariel Mercado
(74) *Attorney, Agent, or Firm* — The Farrell Law Firm, P.C.

(57) ABSTRACT

Disclosed are a system and a method for implementing an XDM forward function described in [XDM2_RD] and [XDM2 AD]. The method includes the steps of: transmitting, by the XDM forward requesting user a forward request message for forwarding a desired XML document to the XDMS; receiving, by the XDMS the forward request message, determining if the XDM forward requesting user has been granted a forward authority for a forward-requested target XML document forwarding the requested XML document to the XDM forward receiving user when the XDM forward requesting user has been granted an authority to forward the target XML document, performing receiver authorization for determining if an XDM forward receiving user can accept the forwarded XML document, and confirming that the XDM forward receiving user owns the forwarded XML document and storing the possessed XML document in a user directory when the receiver authorization has been successfully performed.

20 Claims, 11 Drawing Sheets

(58) Field of Classification Search
USPC .......................................... 715/234, 239, 255
See application file for complete search history.

(56) References Cited

U.S. PATENT DOCUMENTS

| | | |
|---|---|---|
| 2006/0265689 A1 | 11/2006 | Kuznetsov et al. |
| 2007/0043692 A1 | 2/2007 | Oh et al. |
| 2007/0063018 A1* | 3/2007 | Kapis et al. .................. 235/379 |
| 2007/0255714 A1* | 11/2007 | Laurila et al. .................... 707/9 |

FOREIGN PATENT DOCUMENTS

| | | |
|---|---|---|
| JP | 2000-358126 | 12/2000 |
| JP | 2003-281118 | 10/2003 |
| JP | 2004-302569 | 10/2004 |
| JP | 2004-326643 | 11/2004 |
| KR | 1020070021816 | 2/2007 |

OTHER PUBLICATIONS

Open Mobile Alliance (OMA), XML Document Management (XDM) Specification, Jun. 12, 2006, http://www.openmobilealliance.org, Version 1.0, pp. 1-46.*
Written Opinion of Int'l Searching Authority PCT/KR2007/003920
Int'l Search Report PCT/KR2007/003920.
Korean Languages PCT Report PCT/KR2007/003920.
Jaekwon Oh et al., "XDM Forward and XDM History Correction", OMA-RD-XDM-V2_0-20060228-D, Apr. 5, 2006, pp. 1-14.
Open Mobile Alliance, OMA-AD-XDM-V1_0-20060418-C, "XML Document Management Architecture", Candidate Version 1.0, Apr. 18, 2006, pp. 1-19.

* cited by examiner

XDM SYSTEM AND METHOD FOR FORWARDING A DOCUMENT

TECHNICAL FIELD

The present invention relates to a system and a method for implementing an XML Document Management (XDM) forward function, which is one of document management functions of an XDM v2.0 enabler.

BACKGROUND ART

An XDM forward function being one of document management functions of an XDM v2.0 enabler is described in XDM v2.0 requirement [XDM2_RD] (see "OMA XML Document Management Requirements", Version 2.0, Open Mobile Alliance™, OMA-RD-XDM-V2_0, URL:http://www.openmobilealliance.org/) and an XDM v2.0 architecture [XDM2_AD] (Reference: "OMA XML Document Management Architecture", Version 2.0, Open Mobile Alliance™, OMA-AD-XDM-V2_0, URL:http://www.openmobilealliance.org/).

The XDM forward function refers to a document management function for forwarding by a user an XML document stored in an XDMS to other users. In performing the forwarding, a user may either forward the whole of a corresponding XML document, or selectively forward a part of the XML document, or forward the XML document after modifying a part thereof. Upon receiving the XML document, a receiving user makes a decision as to whether the user will accept the forwarded XML document or not. When the receiving user accepts the XML document, the forwarded document is owned by this user and is stored in a user directory of the user within an XDMS.

Meanwhile, a requirement summary technology for the XDM forward function of [XDM2_RD] includes the following description in relation to the requirements of the above-described XDM forward function.

1. A user having a proper authority can forward an XML document(s) to other user(s).
2. A forwarding requesting user can forward a target XML document after adjusting a part thereof while not affecting the original of the target XML document.
3. Upon receiving the forwarded document, a receiving user can make a decision as to whether the user will accept the forwarded XML document or not. Then, when the receiving user accepts the forwarded XML document, a corresponding part thereof is generated into a new XML document of the receiving user to store the generated XML document.

DISCLOSURE

Technical Problem

A system and a method for implementing an XDM forward function have been required.

Technical Solution

The present invention provides a system and a method for implementing an XDM forward function, as described in [XDM2_RD] and [XDM2_AD].

In accordance with an aspect of the present invention, there is provided an XDM (XML Document Management) system for implementing an XDM forward function, the XDM system including: an XDM forward requesting user for transmitting a forward request message so as to forward a desired XML document to be forwarded to an XDM forward receiving user; an XDMS for receiving the forward request message, determining if the XDM forward requesting user has been granted an authority to forward the requesting target XML document, determining if the XDM forward requesting user has been granted an authority to adjust a target XML document when the XDM forward requesting user wants to modify and forward a target XML document, forwarding the requested XML document or a part of the requested XML document adjusted by the filtering and the modification to the XDM forward receiving user when the XDM forward requesting user has been granted an authority to forward the target XML document and an authority to modify the target XML document, performing receiver authorization for determining if an XDM forward receiving user can accept the forwarded XML document or the adjusted part of the XML document, and when the receiver authorization has been successfully performed, confirming that the XDM forward receiving user owns the forwarded XML document or the adjusted part of the XML document and storing the possessed XML document in a user directory of the XDM forward receiving user; and the XDM forward receiving user for transmitting a response with respect to acceptance of the XML document to the XDMS according to a user's response when the XDMS makes a request for receiver authorization.

In accordance with another aspect of the present invention, there is provided a method for implementing an XDM forward function in an XDM system including an XDM forward requesting user, an XDMS, and an XDM forward receiving user, the method including the steps of: transmitting, by the XDM forward requesting user a forward request message for forwarding a desired XML document to the XDM forward receiving user to the XDMS; receiving, by the XDMS the forward request message, determining if the XDM forward requesting user has been granted a forward authority for a forward-requested target XML document or if the XDM forward requesting user has been granted an authority to modify a target XML document when the XDM forward requesting user wants to modify and forward the target XML document, forwarding the requested XML document or a part of the requested XML document adjusted by the filtering and the modification to the XDM forward receiving user when the XDM forward requesting user has been granted an authority to forward the target XML document and an authority to modify the target XML document, and performing receiver authorization for determining if an XDM forward receiving user can accept the forwarded XML document or the adjusted part of the XML document, transmitting, by the XDM forward receiving user a response with respect to the acceptance of the XML document to the XDMS according to a user's response when the XDMS makes a request for receiver authorization; and confirming, by the XDMS that the XDM forward receiving user owns the forwarded XML document and storing the possessed XML document in a user directory when the receiver authorization has been successfully performed.

Advantageous Effects

According to a method proposed in the present invention, it is possible to concretely implement an XDM forward function of the XDM V2.0 service enabler.

BEST MODE

Figure 1:
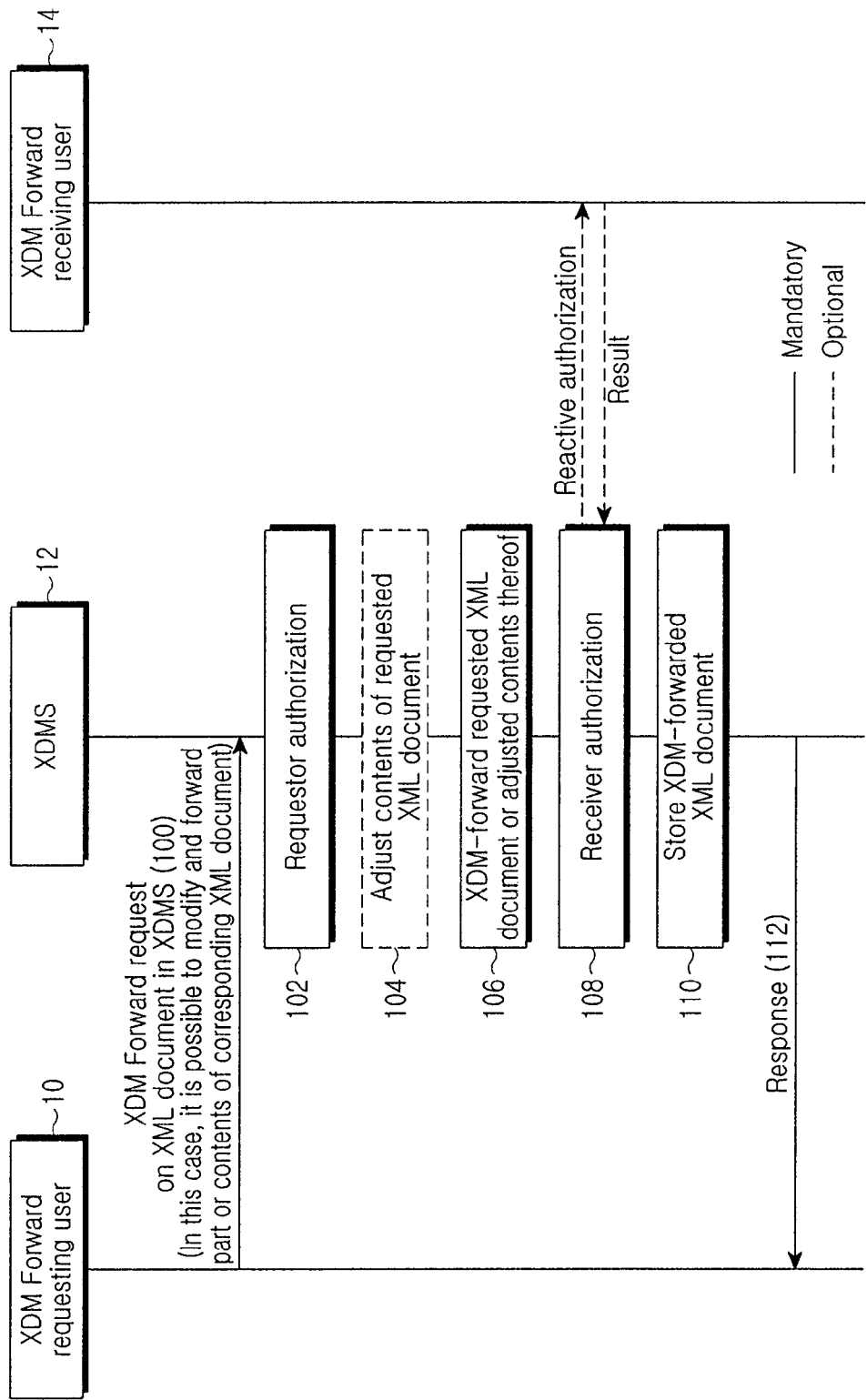
FIG. 1 is a signaling flow diagram showing a construction of an XDM forward function implementation and signaling between respective constructions in a single domain according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In the present invention, a method for implementing an XDM forward function as described in [XDM2_RD] and [XDM2_AD] will be proposed in more detail. To this end, the present invention defines functions of an XDM forward requestor within an XDMC, an XDM forward processing engine within an XDMS, and an XDM forward receiver so as to describe their interoperation. Herein, the XDM forward requestor requests an XDM forward function of a user, the XDM forward processing engine executes the requested XDM forward function, and the XDM forward receiver makes a decision as to whether the user will accept the received XML document or not.

First, an outline of the XDM forward function implementation according to an embodiment of the present invention will be described with reference to FIG. 1. FIG. 1 is a signaling flow diagram showing a construction of an XDM forward function implementation and signaling between respective constructions in a single domain according to an embodiment of the present invention. FIG. 1 corresponds to an embodiment of the present invention in which an XDMS storing a corresponding XML document and an XDMS of an XDM forward receiving user to which the corresponding XML document is delivered belong to the same single domain.

First, in step 100, in a view of a user 10 (which is an XDM Client (XDMC) actually used for XML document management request by the user and will be referred to simply as "XDM forward requesting user" hereinafter) requests forwarding of a particular XML document within the XDMS 12 to a particular user 14 (hereinafter, referred to simply as an "XDM forward receiving user"). At this time, either the whole of, or a part of, or a modified part of a corresponding XML document may be forwarded. The XDM forward request is forwarded to the XDMS 12 that stores a corresponding XML document.

In step 102, the XDMS 12 having the delivered the XDM forward request (actually, the XDM forward request is processed in the XDM forward processing engine within the XDMS) determines if the XDM forward requesting user 10 has been granted an XDM forward authority for the requested XML document. Moreover, when the XDM forward requesting user 10 intends to modify and forward a corresponding XML document, the XDMS 12 also determines if the XDM forward requesting user 10 has been granted a modification authority for a corresponding XML document. In the present invention, such a series of authority checking processes as described above is called requestor authorization. At this time, only if the XDM forward requesting user has the authority to forward the whole of a corresponding XML document, the XDM forward requesting user can forward even only a part of the corresponding XML document without separate requestor authorization. This is because only the difference lies in transmission of the whole XML document and transmission of a part of the XML document.

Then, the XDMS 12 successfully performs the requestor authorization. In step 104, when the request contains information about a filter or a modification of a corresponding XML document, the XDMS 12 adjusts a part of the corresponding XML document to be forwarded after applying the information to the corresponding XML document. Otherwise, the XDMS 12 directly proceeds to step 106.

In step 106, the XDMS 12 forwards the corresponding XML document to the XDM forward receiving user 14, which is a process for delivering the corresponding XML document to the XDMS of the XDM forward receiving user. When a corresponding XML document is requested to be filtered or modified, the XDMS delivers an XML document adjusted according to the requested filtering and modification. In a case of a single domain, since one XDMS is in charge of an identical Application Unique ID (AUID) in a single domain, an XDMS storing a corresponding XML document could be identical to an XDMS of an XDM forward receiving user to which the corresponding XML document is to be delivered. Therefore, the process could be a process for delivering a corresponding XML document to a user directory of the XDM forward receiving user within the identical XDMS. However, since the XDMS is a functional entity, one XDMS can be also implemented by multiple instances at the time of actual implementation. In this case, a forwarding process may be also a delivery process between two XDMS instances being in charge of the identical AUID.

In step 108, the XDMS 12 having delivered the corresponding XML document determines if the XDM forward receiving user 14 can accept the corresponding XML document. In the present invention, a process for determining if the XDM forward receiving user 14 can accept the XML document is called the receiver authorization. A method for performing such a receiver authorization includes two methods, which include a proactive method for determining if the XDM forward receiving user can accept an XML document according to an access rule having been defined by a user without directly inquiring of a user, and a reactive authorization method for directly inquiring of a user so as to check if the XDM forward receiving user can accept an XML document.

After successfully performing the receiver authorization in step 108, the XDMS 12 stores the forwarded XML document in a user directory of the XDM forward receiving user since the forwarded XML document belongs to the ownership of a corresponding XDM forward receiving user (step 110).

In step 112, the XDMS 12 sends an execution result in response to the XDM forward request to the XDM forward requesting user 10.

Figure 2:
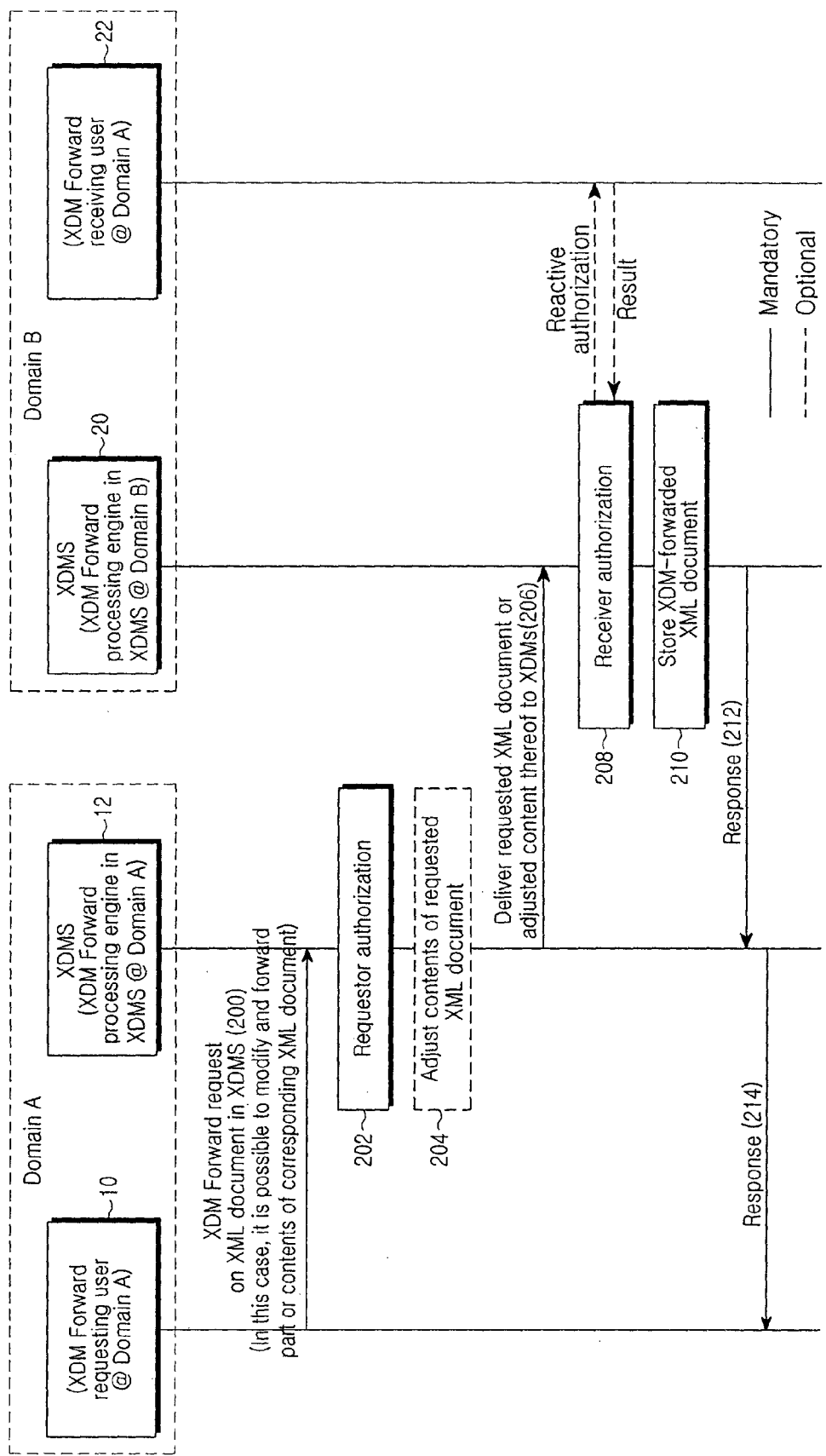
FIG. 2 is a signaling flow diagram showing a construction of an XDM forward function implementation and signaling between respective constructions in multiple domains according to an embodiment of the present invention.

Referring to FIG. 2, a case of multiple domains in which an XDMS storing a corresponding XML document is not identical to an XDMS of an XDM forward receiving user 14 to which a corresponding XML document is to be delivered will be described. FIG. 2 is a signaling flow diagram showing constructions and operation of the XDM forward function implementation proposed in the present invention.

First, the XDM forward requesting user 10 requests a particular XML document within the XDMS 12 to be forwarded to a particular XDM forward receiving user 22 in step 200. At this time, either the whole of, or a part of, or a modified part of a corresponding XML document may be forwarded. The XDM forward request is delivered to the XDMS 12 storing the corresponding XML document.

In step 202, the XDMS 12 having delivered the XML document performs the requestor authorization for determining if the XDM forward requesting user 10 has been granted an XDM forward authority for the requested XML document, and if the XDM forward requesting user 10 has been granted a modification authority for a corresponding XML document when the XDM forward requesting user 10 intends to modify and forward the corresponding XML document. After successively performing the requestor authorization, the XDMS 12 adjusts the corresponding XML document by filtering or modifying the corresponding XML document in step 204. In step 206, the requested XML document or the XML document adjusted in step 240 is delivered to an XDMS 20 of a domain B (i.e. another domain).

After the XDMS 20 of the domain B has delivered the XML document, the XDMS 20 performs the receiver authorization for determining if the XDM forward receiving user 22 can accept the forwarded XML document, in step 208. After the XDMS 20 successfully performs the receiver authorization, the forwarded XML document is owned by a corresponding XDM forward receiving user, and then the XDMS 20 stores the XML document in a user directory of the user, in step 210.

In step 212, the XDMS 20 sends an execution result in response to the XDM forward request to the XDM forward requesting user 10 through the XDMS 12 of the domain A.

A basic procedure of the XDM forward function between multiple domains also is the same as that of the above-described single domain in FIG. 2. However, there is a difference in that a requested XML document is delivered from an XDMS of one domain to an XDMS of another domain and the receiver authorization and the forwarded XML document storage is performed by an XDMS of a domain to which the XDM forward receiving user belongs.

Hereinafter, issues to be considered in implementing an XDM forward function will now be described. First, the implementation proposed in the present invention is designed to meet not only the requirement for the XDM forward function of the above-described [XDM2_RD], but also the following four conditions.

1. Expression of the Target XML Document Using an XCAP URI

When an XML document being the XDM forward target is directly contained in the XDM forward request, the XDM forward requesting user first retrieves a corresponding XML document from the XDMS before making a request for the XDM forward, and then inserts the retrieved XML document into the XDM forward request, which will be described with reference to FIG. 3.

The XDM forward requesting user 10 requests a target XML document by transmitting an XCAP GET request message to the XDMS 12. Then, the XDMS 12 delivers the target XML document through a 200 OK message. After receiving the message, the XDM forward requesting user 10 transmits an XDM forward request message containing the target XML document to the XDMS 12. After receiving the target XML document, the XDMS 12 delivers a result of the XDM forward to the XDM forward requesting user 10.

Figure 3:
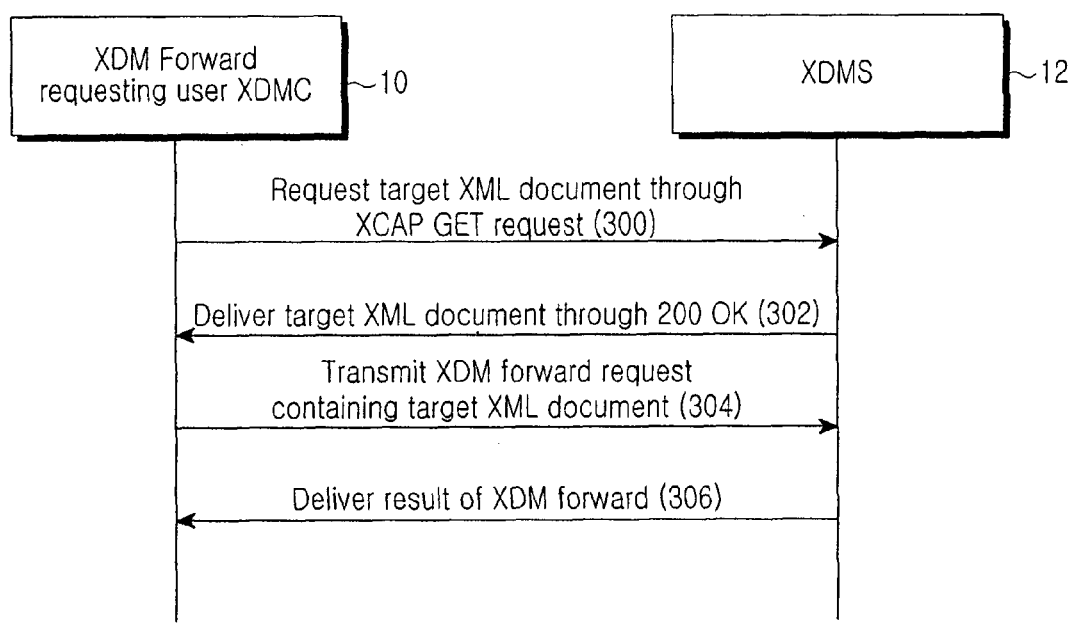
FIG. 3 is a signaling flow diagram showing a case where a target XML document is directly inserted into an XDM forward request, according to an embodiment of the present invention.
Figure 4:
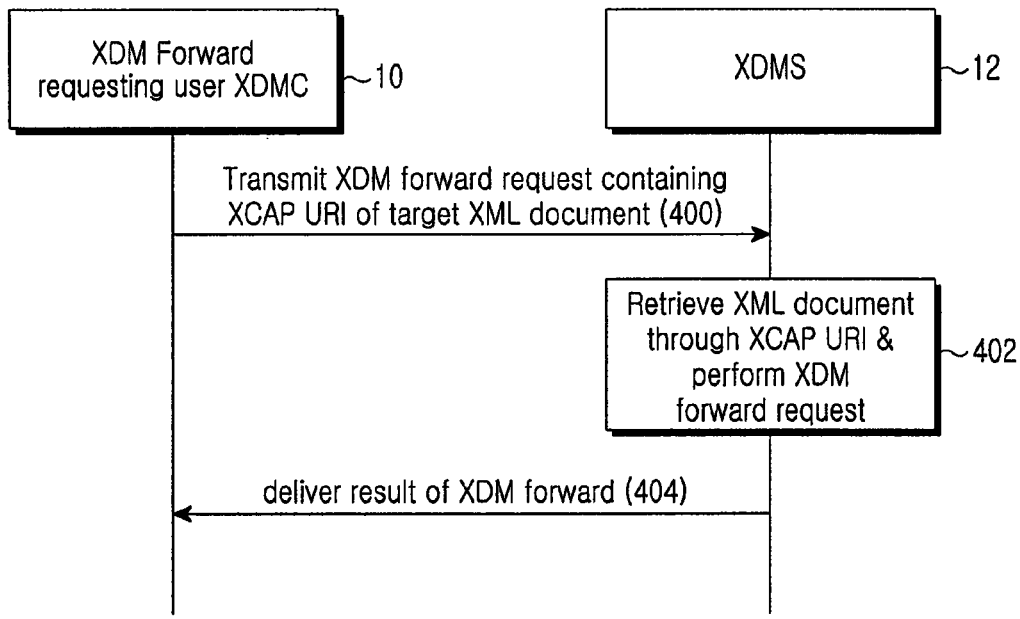
FIG. 4 is a signaling flow diagram showing a case of indirectly recording a target XML document by inserting only an XCAP URI of a target XML document into an XDM forward request according to an embodiment of the present invention.

As can be seen from FIG. 3, such processes result in signaling overhead occurring when the target XML document is repeatedly exchanged between the XDM forward requesting user 10 and the XDMS 12. Particularly, when an access network of the XDM forward requesting user is wireless, the signaling overhead may cause a waste of access channel resources and a delay of response time. To solve these problems, the present invention proposes a method for implementing an XDM forward function by which an XML document being the XDM forward target is not directly contained in the XDM forward request, but an only an XCAP URI recording a location of the XDMS where the target XML document is stored is contained in the XDM forward request, so that the corresponding XML document can be indirectly recorded in an XDM forward request. A process for performing the forward function through the XDM forward request message containing only the XCAP URI instead of the target XML document will be described with reference to FIG. 4.

First, the XDM forward requesting user 10 transmits the XDM forward request message containing an XCAP URI of the target XML document to the XDMS 12. After receiving the XDM forward request message, the XDMS 12 retrieves a target XML document through the XCAP URI and performs the XDM forward request. Then, the XDMS 12 delivers a result of an XDM forward to the XDM forward requesting user 10.

The indirect recording of the target XML document results in reduction of signaling overhead between the XDM forward requesting user and the XDMS. Therefore, it is possible to solve the waste of channel resources and the delay of response time caused by the repeated information exchange as in the case of FIG. 3.

2. Applying a Filter to the Target XML Document

Figure 5:
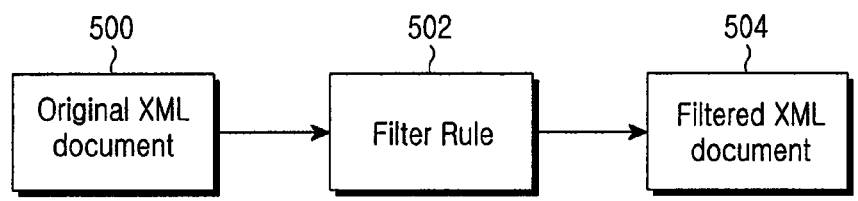
FIG. 5 is a conceptual diagram showing a case where a filter rule is applied to an XML document according to an embodiment of the present invention.

In the present invention, it is possible for the XDM forward requesting user to XDM-forward only a part of the target XML document without modifying the original target XML document. To this end, the present invention enables the XDM forward requesting user to contain a filter rule for the target XML document in an XDM forward request by applying a filter to the target XML document. At this time, the application of the filter enables only a part of the target XML document resulting from the filter rule to be forwarded without affecting the original target XML document. FIG. 5 is a conceptual diagram showing the filter application for the target XML document. Referring to FIG. 5, an original XML document 500 is generated into a filtered XML document 504 through a filter rule 502.

3. A Method for Routing the XDM Forward Request

The method for routing an XDM forward request includes two methods including a method of first routing the XDM forward request to an XDMS of the XDM forward requesting user and a method of routing the XDM forward request to an XDMS of the XDM forward receiving user. These two methods have a clear difference when a domain of an XDM forward requesting user is different from that of an XDM forward receiving user, which will be described with reference to FIGS. 6 and 7.

First, a method for first routing the XDM forward request to the XDMS of the XDM forward requesting user will be described with reference to FIG. 6.

Figure 6:
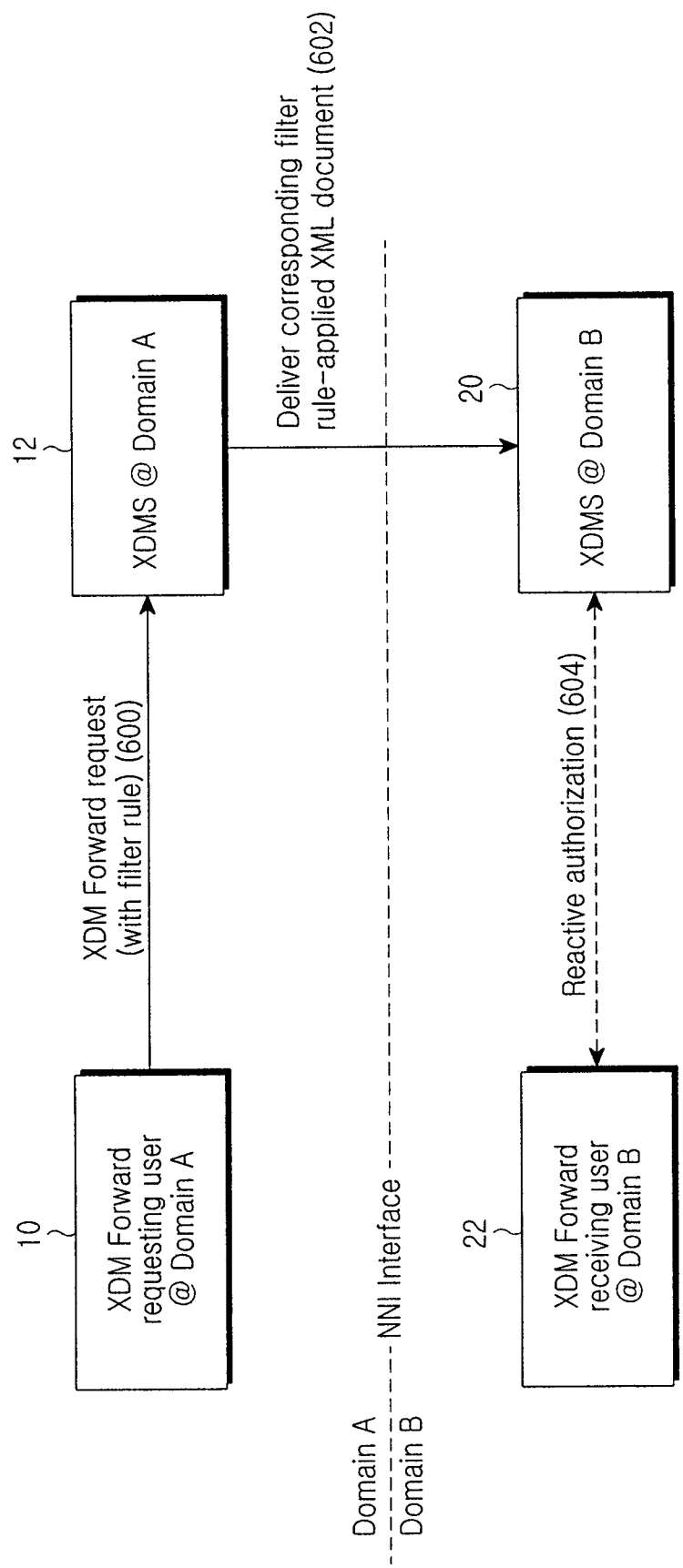
FIG. 6 is a view for explaining a method for first routing an XDM forward request to an XDMS of an XDM forward requesting user among methods for routing an XDM forward request according to an embodiment of the present invention.

Referring to FIG. 6, the XDM forward requesting user 10 of the domain A makes a request for the XDM forward through the XDM forward request message and then first routes the XDM forward request to the XDMS 12 of the domain A, which is the same domain as the domain A of the XDM forward requesting user 10. Then, the XDMS 12 checks the authority of the XDM forward requesting user of the domain A (i.e. the same domain), and delivers either a part of the XML document adjusted by the filter rule or a target XML document to the XDMS 20 of a domain B including the XDM forward receiving user. The XDMS 20 of the domain B stores the delivered document after determining if the XDM forward receiving user 22 within the domain B (i.e. the same domain) can accept the delivered document.

Exchange and management of information within the identical domain are easy, whereas exchange and management of information between different domains are accomplished through a Network-to-Network interface (NNI) and requires more complicated procedures. In this regard, the method shown in FIG. 6 is efficient. This is because, in the method of FIG. 6, the operations occurring in mutually different domains correspond to only a simple exchange of a target XML document or a filtered part of the target XML document between them without requiring management such as an authorization thereof. No requirement for authorization between mutually different domains is possible because the requestor authorization and the receiver authorization are accomplished only between an XDMS and a user within each identical domain, as described above.

Further, in the method shown in FIG. 6, when the target XML document is delivered between mutually different domains, since only a part of an XML document resulting from the filtering is delivered, a desired part to be filtered by the XDM forward requesting user can never be delivered to a different domain. Therefore, it can be said that the method shown in FIG. 6 is secure in terms of security maintenance for information of the XDM forward requesting user.

Second, a method for routing the XDM forward request to the XDMS of the XDM forward receiving user will be described with reference to FIG. 7.

Figure 7:
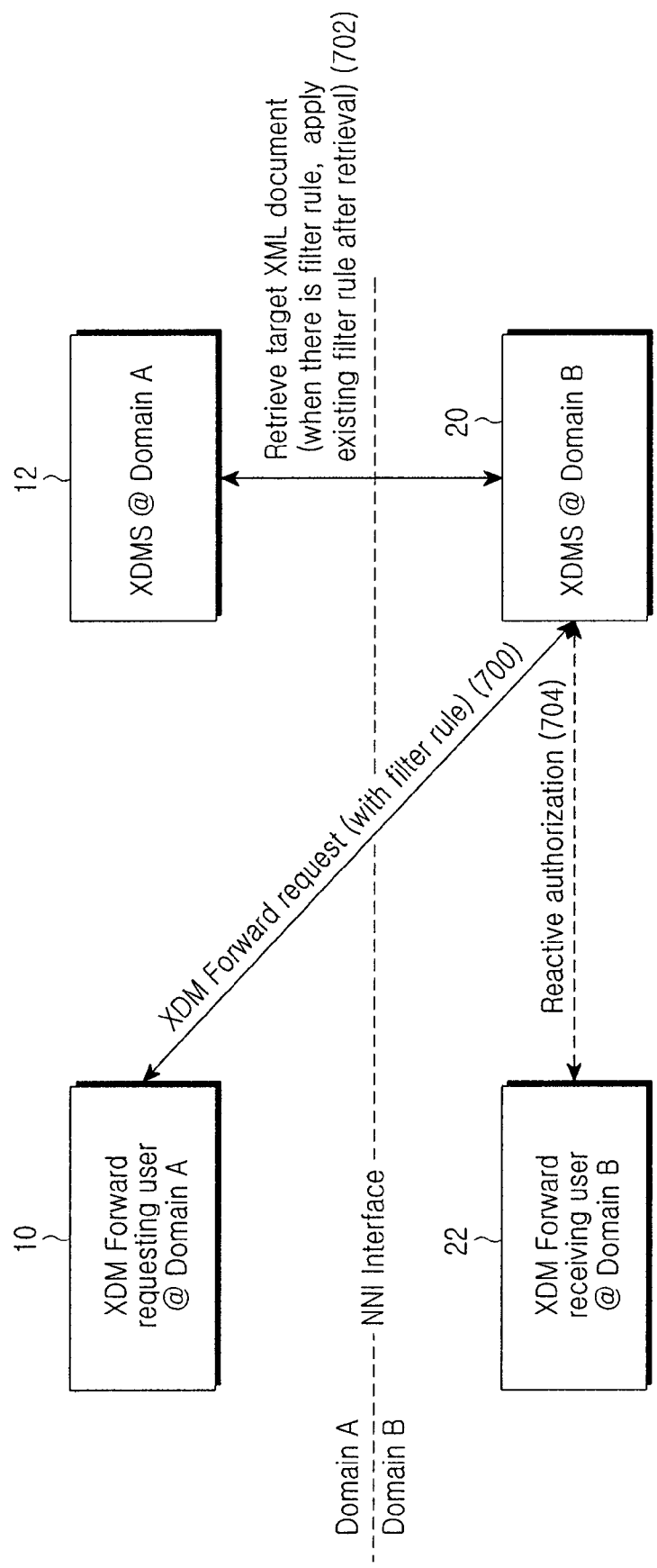
FIG. 7 is a view for explaining a method for first routing an XDM forward request to an XDM forward receiving user among methods for routing an XDM forward request according to an embodiment of the present invention.

Referring to FIG. 7, the XDM forward requesting user 10 of the domain A makes a request for the XDM forward through the XDM forward request message, and routs the XDM forward request to the XDMS 20 of the XDM forward receiving user 22 of the domain B in which a forwarding target is to be stored. The XDMS 20 of the domain B makes a request for a corresponding XML document to the XDMS 12 of the domain A that the corresponding XML document has been stored. Then, the XDMS 12 of the domain A determines if the XDM forward requesting user 10 has been granted the right authority, and delivers a target XML document to the XDMS 20 of the domain B. When the XDM forward request contains a filtering rule, the XDMS 22 of the domain B adjusts a part of the delivered XML document by applying the filtering rule to the delivered XML document, determines if the XDM forward receiving user can accept the adjusted XML document, and stores the adjusted XML document.

Since the method described in FIG. 7 is based on the fact that both a process delivering the XDM forward request to the XDMS and a process retrieving a target XML document are performed through the NNI interface between mutually different domains, the method described in FIG. 7 is less efficient than the method described in FIG. 6.

Furthermore, in the method shown in FIG. 7, the filtering rule together with the XDM forward request is delivered to another domain, and then an XDMS of another domain (i.e. the XDMS of the domain B) directly applies the filtering rule to a corresponding XML document. Therefore, there may be a problem in security maintenance for information of the XDM forward requesting user 10, because the whole of the corresponding XML document containing a desired part to be filtered by the XDM forward requesting user must be delivered to the domain B (i.e. another domain).

Accordingly, the present invention proposes that the XDM forward function should be implemented while putting the method of FIG. 6 prior to the method of FIG. 7.

4. XDM Forward Either to a Plurality of Users or to a Group

Figure 8:
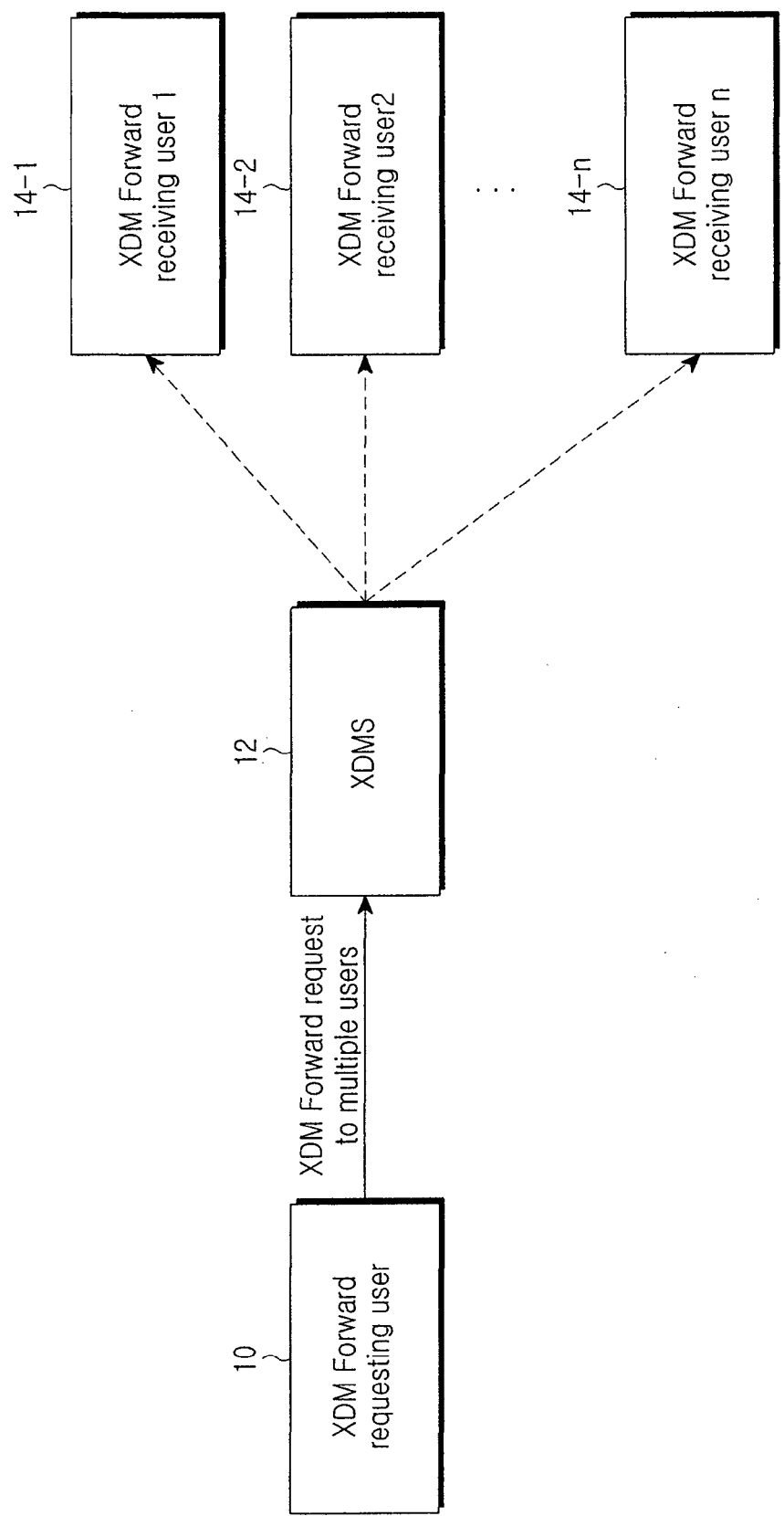
FIG. 8 is a view for explaining an XDM forward for multiple users according to an embodiment of the present invention.
Figure 9:
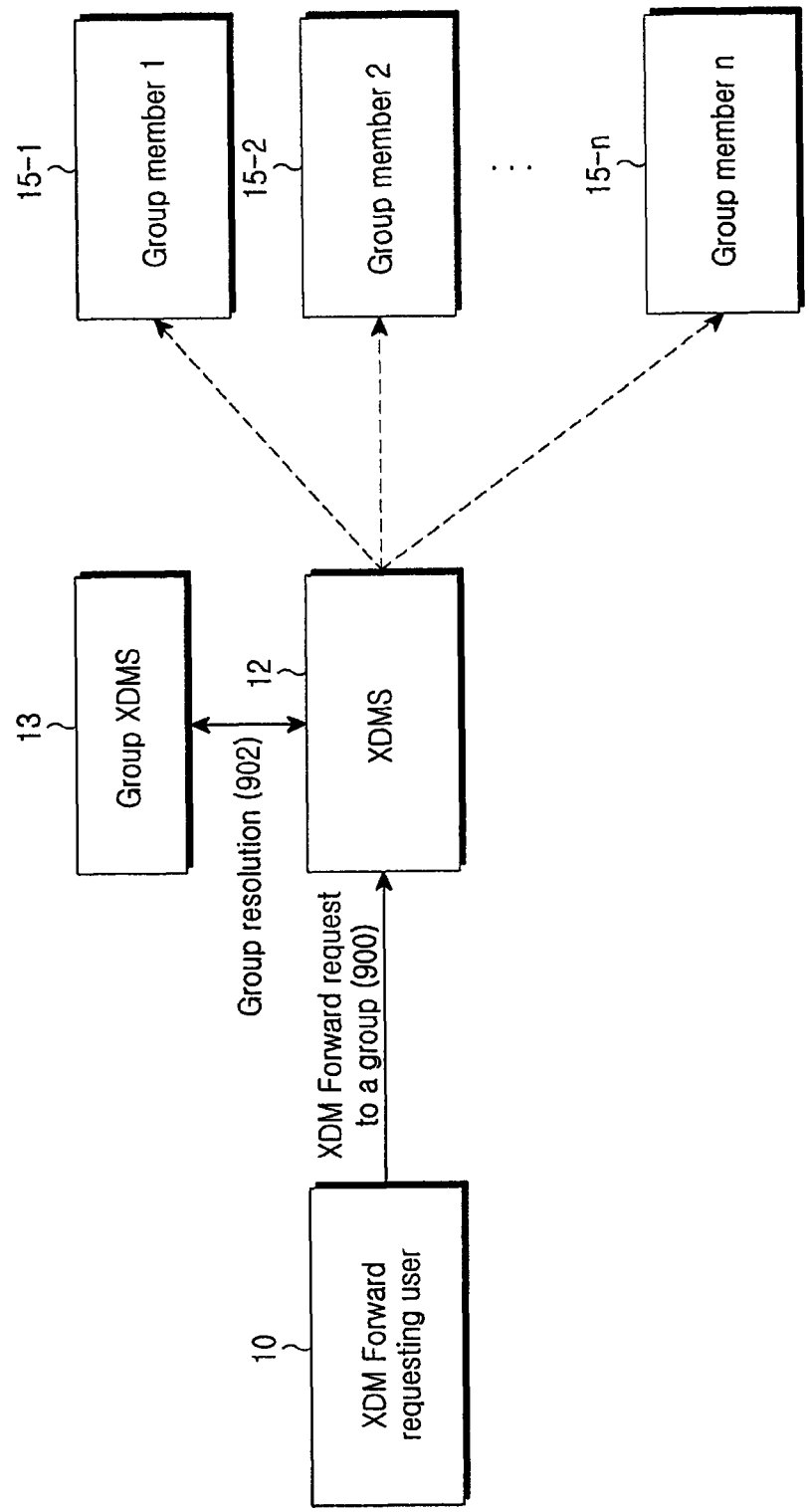
FIG. 9 is a view for explaining an XDM forward for a group according to an embodiment of the present invention.

As shown in FIGS. 8 and 9, according to the XDM forward function, a corresponding XML document should be XDM-forwarded either to a number of XDM forward receiving users or to a group of XDM forward receiving user by using one XDM forward request. Referring to FIG. 8, the XDM forward requesting user 10 sends XDM forward request messages for multiple users to the XDMS 12. Then, the XDMS 12 receives the messages, and performs the XDM forward function for corresponding n XDM forward receiving users 14-1 to 14-N. As shown in FIG. 9, when a target to which the XDMS 12 is requested by the XDM forward requesting user 10 to forward the XML document corresponds to the group, that is, a case of the XDM forward request for the group, the XDMS 12 retrieves this group information from the group XDMS 13, performs the resolution for the members, and performs the XDM forward to each of the group members 15-1 to 15-N.

Then, based on the requirements for the above-described XDM forward function of [XDM2_RD] and the above-described four issues to be considered in implementing the XDM forward function, the present invention proposes concrete implementation methods of the XDM forward function. Specifically, the present invention proposes four methods for implementing an XDM forward function.

First, for explanation of the XDM forward function implementations proposed in the present invention, a PoC group document of Table 1 below is used as an example of the XML document being a target of the XDM forward. On the assumption that the PoC group document used as the example is described based on [PoC_XDM] (Reference: "PoC XDM Specification", Version 1.0, Open Mobile Alliance™, OMA-TS-PoC_XDM-V1_0, URL:http://www.openmobilealliance.org/), the owner of this document is "sip: source_user@example.com", and the file name of this document is "source-poc-group.xml". It is also assumed that the PoC group document has been stored in a user directory of the "sip:source_user@example.com" within a PoC XDMS (whose AUID is an org.openmobilealliance.poc) of a current "example.com" domain. Therefore, a location within the XDMS of the PoC group document is recorded as an XCAP URI of "http://xcap.example.com/org.openmobilealliance.poc/users/sip:source_user@example.com/source-poc-group.xml."

TABLE 1

```
<?xml version="1.0" encoding="UTF-8"?>
<group xmlns="urn:oma:xml:poc:list-service"↓
    xmlns:rl="urn:ietf:params:xml:ns:resource-lists"↓
    xmlns:cr="urn:ietf:params:xml:ns:common-policy"↓
    xmlns:ocr="urn:oma:xml:xdm:common-policy">
    <list-service uri="sip:my_pocgroup@example.com">
        <list>
            <entry uri="tel:+43012345678"/>
            <entry uri="tel:+82254651154"/>
            <entry uri="sip:cherryblossom@exemple.com"/>
            <entry uri="sip:jay@other.domain.com"/>
        </list>
        <invite-members>true</invite-members>
        <cr:ruleset>
            <cr:rule id="45x">
                <cr:conditions>

</cr:conditions>
                <cr:actions>
                    <join-handling>falus</join-handling>
                </cr:actions>
            </cr:rule>
        </cr:ruleset>
    </list-service>
</group>
```

First, a method using an HTTP POST request among XDM forward function implementation methods will be described.

The present invention proposes that the XDM forward function should be implemented based on the HTTP POST request with the following sub-clause and an XDM system process the XDM forward request according to the following four conditions.

1. Implementation of the XDM Forward Request

The present invention proposes the following implementation of the XDM forward request based on the HTTP POST request. Table 2 below shows an example in relation to the implementation of the XDM forward request.

TABLE 2

```
POST http://xcap.example.com/org.openmobilealliance.poc/
forward HTTP/1.1
Host: xcap.example.com
User-Agent: XDM-client/OMA1.0
Date: Tue, 01 Aug 2006 17:00:01 GMT+9
X-XCAP-Asserted-Identity: "sip:forwarder@example.com"
```

TABLE 2-continued

```
Content-Type: application/vnd.oma.forward+xml
Content-Length: (. . .)
<?xml version="1.0" encoding="UTF-B"?>
<forward id="xxx" xmlns="urn:oma:xml:xdm:forward">
    <!-- XCAP URI of the target XML document to be XDM
    Forwarded -->
    <target appid="org.openmobilealliance.poc">
            http://xcap.example.com/org.openmobilealliance.poc/users/
        sip:source_user@example.com/source-poc-group.xml
    </target>
    <!-- List of recipients of XDM Forward -->
    <recipients>
            <recipient>sip:recipient_1@example.com</recipient>
            <recipient>sip:recipient_2@example.com</recipient>
            <recipient>sip:forward_group@example.com</recipient>
            <recipient>sip:user@example2.com</recipient>
    </recipients>
</forward>
```

1) Request Line

The request line of the HTTP POST request by which the XDM forward request records an HTTP URI containing both an XDMS for processing the XDM forward recorded in a content body and an XDM forward processing engine within this XDMS. In this case, the XDMS to which the XDM forward request is routed must be a spot where an XML document to be XDM-forwarded has been stored.

In the example of Table 2, the request line is "http://xcap.example.com/org.openmobilealliance.poc/forward." This implies that the HTTP POST request is routed to the PoC XDMS (i.e. an XDMS being in charge of the AUID of "org.openmobilealliance.poc" of an "example.com" domain), and this HTTP POST request is to be processed in an XDM forward processing engine in "/forward" within this PoC XDMS. An XCAP URI for the target XML document recorded in the content body is in the format of "http://xcap.example.com/org.openmobilealliance.poc/users/sip:source_user@example.com/source-poc-group.xml," where the "http://xcap.example.com/org.openmobilealliance.poc" corresponds to an address of the XDMS where the document is stored. Therefore, it is noted that the address of the XMDS for storing the document is identical to that of the PoC XDMS recorded in the request line of the HTTP POST request. That is, this target XML document has been stored in the PoC XDMS.

2) ID of an XDM Forward Requesting User

The XDM forward requesting user 10 making a request for the XDM forward may be recorded in either an "X-XCAP-Asserted-ID" [XDM_Core] (Reference: "XML Document Management (XDM) Specification", Version 1.0, Open Mobile Alliance™, OMA-TS-XDM_CORE-V1_0, URL:http://www.openmobilealliance.org/) or a corresponding HTTP header. It can be understood that the XDM forward requesting user corresponds to "sip:forwarder@example.com" in the example of Table 2.

3) Contents of the XDM Forward

The contents of the XMD forward must be basically recorded as follows:

(a) XCAP URI of the XML document being the target of the XDM forward; and (b) XDM forward receiving user(s) to which the XDM forwarded contents are to be delivered.

Figure 10:
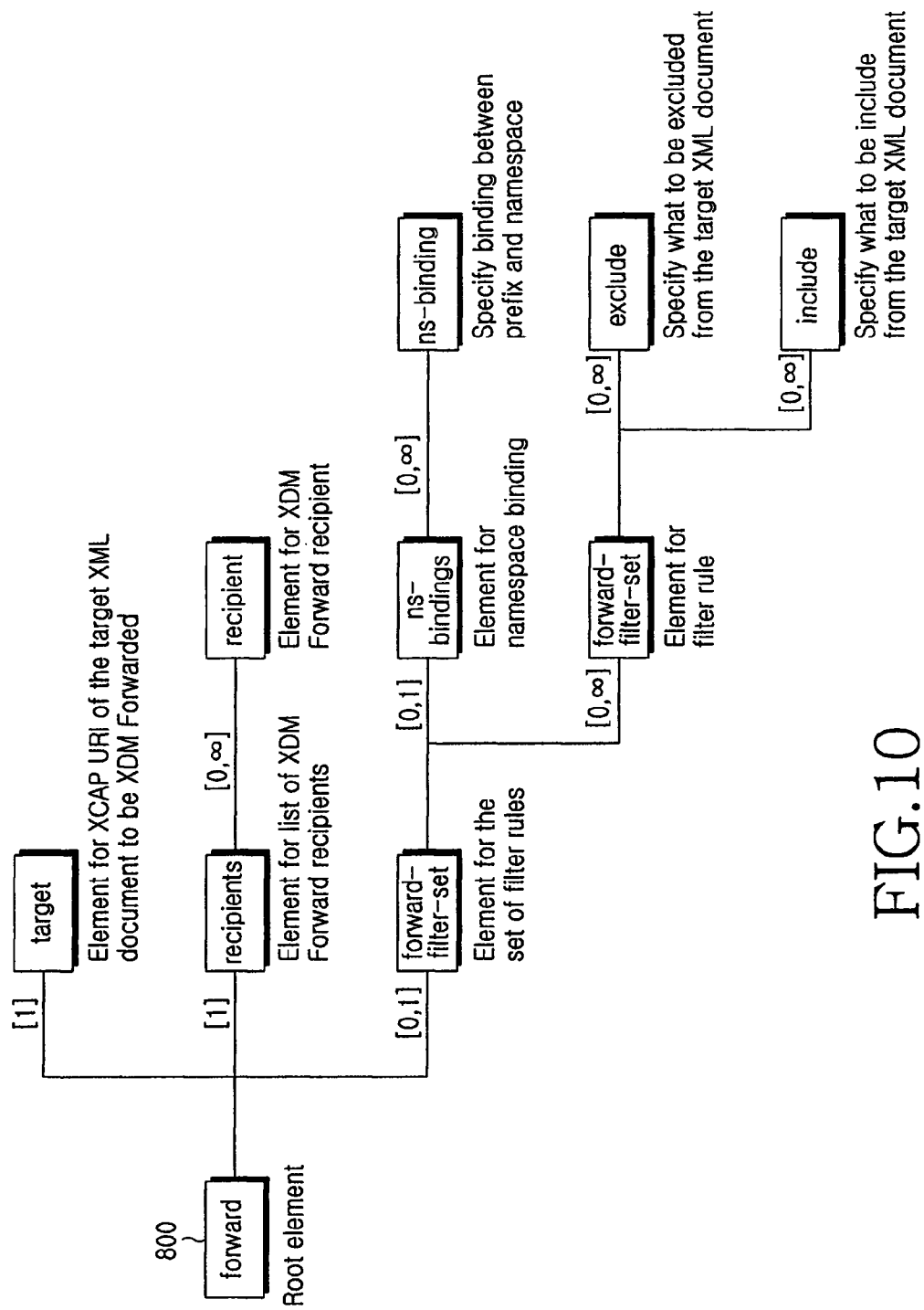
FIG. 10 is a view showing an example of an XML structure of 'application/vnd.oma.foward+xml'.

Such contents can be expressed in XML. In this case, it is necessary to define a new content type for the expression. In the present invention, it is assumed that this is 'application/vnd.oma.foward+xml'. FIG. 10 shows an example of an XML structure in which the XDM forward contents are recorded.

Referring to FIG. 10, a root element is a <forward>, which includes a <target> recording an XCAP URI of the XML document being the target of the XDM forward, a <recipients> recording the XDM forward receiving users, and child elements of a <forward-filter-set> recording the filter rule to be applied to the target XML document. Herein, the <target> and the <recipients> must inevitably exist since they basically record the contents of the XML document forward, and the <filter-rule-set> may selectively exist. Hereinafter, the filter rule will be described in more detail. In the <recipients>, each of the XDM forward receiving users <recipient> is recorded by the <recipient> child element. Therefore, there may be a plurality of <recipient> elements.

Table 2 shows an example of the XDM forward content of 'application/vnd.oma.foward+xml' content type. That is, the XCAP URI of the target XML document recorded in the <target> element is "http://xcap.example.com/org.openmobilealliance.poc/users/sip:source_user@example.com/source-poc-group.xml." In this case, an 'auid' attribute of the <target> element represents its AUID and provides a kind of the XML document. Also, XDM forward receiving users recorded in the <recipients> correspond to sip:recipient_1@example.com, sip:recipient_2@example.com, and sip:forward_group@example.com, sip:user@example2.com.

As described in the issues to be considered, it is possible to achieve the XDM forwarding for ultiple XDM forward receiving users or the group. It is clear from the example of Table 2 that the target XML document is to be XDM forwarded to users of the "sip:recipient_1@example.com" and the "sip:recipient_2@example.com" and a group of the "sip:forward_group@example.com" within the "example.com" domain, and "sip:user@example2.com" within an example2.com domain.

4) XDM Forward Filter

As described above, the XDM forward requesting user uses a filter so that only a part of the target XML document can be XDM-forwarded. To this end, the filter rule may be contained in the XDM forward request. Such a filter rule must basically recorded the following conditions.

(a) a target XML document to which the filter rule is to be applied (b) a case of the filter rule application (e.g. application of the filer rule only if an XML document is forwarded to a specific receiver)

(c) recording of contents to be filtered

Such contents are expressed in XML and may be contained as the content of the XDM forward request. As shown in the example of FIG. 10, the content of 'application/vnd.oma.foward+xml' recordes filter rules, applied to the target XML document recorded in the <target>, in the <forward-filter-set>. Such a <forward-filter-set> may have a number of <forward-filter> child elements, and each <forward-filter> child element recordes each filter rule. An 'id' attribute of the <forward-filter> represents an identification of this filter rule and a 'recipient' attribute represents an XDM forward receiving user when the recorded filter rule is applied. In a case of no 'recipient' attribute, the recorded filter rule is applied at the time of XDM forwarding to all XDM forward receiving users.

Actually, a method for recording a filter rule includes two methods including a method of recording only a part which is to be filtered out from an original XML document and is to be excluded and a method of recording only a part which is to be filtered into an original XML document and is to be contained. They are recorded in an <exclude> element and an <include> element, i.e. a child element of the <forward-filter>. Herein, an XPATH Node URI [XCAP] (see "The Extensible Markup Language (XML) Configuration Access protocol (XCAP)" by J. Rosenberg, May 5, 2006, URL: http://www.ietf.org/internet-drafts/draft-ietf-simple-xcap-11.txt) of the highest element of the part to be filtered out from the target XML document and excluded at the time of XDM forwarding is recorded in the <exclude> element. Herein, an XPATH Node URI for the part to be filtered in the target XML document and contained at the time of the XDM forward is recorded in the <include> element. An <ns-bindings> element specifies namespace bindings used at the time of the recording the XPATH URI. Table 3 below shows an example where the above-explained filter rules are added to the XDM forward request of Table 2.

TABLE 3

POST http://xcap.example.com/org.openmobilealliance.poc/forward HTTP/1.1
Host: xcap.example.com
User-Agent: XDM-client/OMA1.0
Date: Tue, 01 Aug 2006 17:00:01 GMT+9
X-XCAP-Asserted-Identity: "sip:forwarder@example.com"
Content-Type: application/vnd.oma.forward+xml
Content-Length: (. . .)
<?xml version="1.0" encoding="UTF-8"?>
<forward id="xxx" xmlns="urn:oma:xml:xdm:forward">
    <!-- XCAP URI of the target XML document to be XDM Forwarded -->
    <target appid="org.openmobilealliance.poc">
        http://xcap.example.com/org.openmobilealliance.poc/users/sip:source_user@example.com/source-poc-group.xml
    </target>
    <!-- List of recipients of XDM Forward -->
    <recipients>
        <recipient>sip:recipient_1@example.com</recipient>
        <recipient>sip:recipient_2@example.com</recipient>
        <recipient>sip:forward_group@example.com</recipient>
        <recipient>sip:user@example2.com</recipient>
    </recipients>
    <!-- Filter rules to be applied to the target XML document when XDM Forwarded -->
    <forward-filter-set>
        <!-- Namesapce binding -->
        <ns-bindings>
            <ns-binding prefix="poc" urn="urn:oma:xml:poc:list-service"/>
            <ns-binding prefix="cr" urn=" urn:ietf:params:xml:ns:common-policy"/>

TABLE 3-continued

```
        </ns-bindings>
        <!-- 'xyz' filter rule -->
        <forward-filter id="xyz">
            <exclude type="xpath">
                /poc:group/poc:list-service/poc:invite-members
            </exclude>
            <exclude type="xpath">
                /poc:group/poc:list-service/cr:ruleset
            </exclude>
        </forward-filter>
        <!-- 'abc' filter rule -->
        <forward-filter id="abc" recipient="sip:recipient_2@example.com">
            <exclude type="xpath">
                /poc:group/poc:list-service/poc:list/poc:entry[@uri="sip:cherryblosson@example.com"]
            </exclude>
        </forward-filter>
    </forward-filter-set>
</forward>
```

The content of the XDM forward request in Table 3 shows two types of filter rules to be applied to a PoC group document (i.e. target of the XDM forward request) having an XCAP URI of "http://xcap.example.com/org.openmobilealliance.poc/users/sip:source_user@example.com/source-poc-group.xml". One is a filter rule having an 'id' of 'xyz', and the other is a filter rule having an 'id' of 'abc'. In the 'xyz' filter rule, there is no 'recipient' attribute, so that the filter rule is applied to all XDM forward receiving users at the time of the XDM forwarding, thereby removing all contents of a <ruleset> from the target PoC group document. In the 'abc' filter rule, the filter rule is applied only when an XML document is forwarded to a user of "sip:recipient_2@example.com", and the 'abc' filter rule records that an <entry> recording "sip:cherryblossom@example.com" can be removed from the PoC group list. Table 4 below shows a case where the 'xyz' filter rule is applied to the target PoC group document to be delivered to the rest receivers except for a receiver of "sip:recipient_2@example.com". Table 5 shows a case where both the 'xyz' filter rule and the 'abc' filter rule are applied to the target PoC group document, which is to be delivered to a receiver of "sip:recipient_2@example.com".

Herein, it is noted that these filter rules are applied only when they are XDM-forwarded without affecting the original XML document.

TABLE 4

```
<?xml version="1.0" encoding="UTF-8"?>
<group xmlns="urn:oma:xml:poc:list-service"
       xmlns:rl="urn:ietf:params:xml:ns:resource-lists"
       xmlns:cr="urn:ietf:params:xml:ns:common-policy"
       xmlns:ocr="urn:oma:xml:xdm:common-policy">
    <list-service uri="sip:my_pocgroup@example.com">
        <list>
            <entry uri="tel:+43012345678"/>
            <entry uri="tel:+82254651154"/>
            <entry uri="sip:cherryblossom@exemple.com"/>
            <entry uri="sip:jay@other.domain.com"/>
        </list>
    </list-service>
</group>
```

TABLE 5

```
<?xml version="1.0" encoding="UTF-8"?>
<group xmlns="urn:oma:xml:poc:list-service"
       xmlns:rl="urn:ietf:params:xml:ns:resource-lists"
       xmlns:cr="urn:ietf:params:xml:ns:common-policy"
```

TABLE 5-continued

```
       xmlns:ocr="urn:oma:xml:xdm:common-policy">
    <list-service uri="sip:my_pocgroup@exemple.com">
        <list>
            <entry uri="tel:+43012345678"/>
            <entry uri="tel:+82254651154"/>
            <entry uri="sip:jay@other.domain.com"/>
        </list>
    </list-service>
</group>
```

2. Process of the Implemented XDM Forward Request

The implemented XDM forward request is processed by procedures of FIGS. 1 and 2. That is, a case of the XDM forward request as implemented in Table 3 is processed as follows:

1) A user of "sip:forwarder@example.com" makes a request for the XDM forward shown in Table 3 and the XDM forward request is delivered to the PoC XDMS of an example.com domain;

2) The PoC XDMS of the example.com domain determines if the user of "sip:forward@example.com" has been granted an authority to XDM-forward "source-poc-group.xml" of a user of "sip:source_user@example.com";

3) After successive checking, the PoC XDMS of the example.com domain generates the contents of Table 4 by applying the 'xyz' filter rule to the source-poc-group.xml. The PoC XDMS also generates the content of Table 5 by applying the 'xyz' filter rule and the 'abc' filter rule; and 4) The PoC XDMS of the example.com domain recognizes a "sip:forward_group@example.com" as a shared group URI, and thus retrieves its member list from the shared XDMS of the example.com domain. In this case, it is assumed that all members of this group are users of the example.com domain. Contents of Table 4 are delivered to a user directory in the PoC XDMS of the users of the member list users and the user of "sip:recipient_1@example.com," and contents of Table 5 are delivered to a user directory of "sip:recipient_2@exmaple.com."

Further, the PoC XDMS of the example.com domain recognizes that the user of "sip:user@example2.com" exists in the example2.com domain, and thus delivers the contents of Table 4 to the PoC XDMS of the example2.com domain. The process in the example2.com domain follows the process after sub-step 5-1).

5) The PoC XDMS of the example.com domain determines if the member users of "sip:

forward_group@example.com" and the user of "sipsecipient_1@example.com" wants to receive the contents of Table 4, and if the user of "sip:recipient_2@example.com" wants to receive the contents of Table 5. In this case, the PoC XDMS may perform the receiver authorization according to either a rule for the PoC XDMS of the example.com domain predefined by a user or a direct request to a corresponding user.

6) After successfully performing the receiver authorization, the PoC XDMS of the example.com domain stores each of the delivered contents in the user directory of each of the users. In this case, any file name can be used. Herein, the file name is expressed by adding an ID of an XDM forward requesting user to an original XML document. That is, the stored content is stored under the file name of source-poc-group [forwarder@example.com].xml.

7) The PoC XDMS of the example.com sends an execution result of the XDM forward request to "sip:forwarder@example.com."

The PoC XDMS of the example2.com domain having received the contents of Table 4 as described in step 4) is performed according to the following sub-steps.

5-1) The PoC XDMS of the example2.com domain determines if the user of "sip:user@example2.com" wants to receive the contents of Table 4.

6-1) After successfully performing receiver authorization, the PoC XDMS of the example2.com domain stores the content of Table 4 in the user directory of the user of "sip:user@example2.com".

7-1) The PoC XDMS of the example2.com domain sends an execution result of the XDM forward request to the PoC XDMS of the example.com domain.

3. A Method for Delivering a Target XML Document or Filtered Part Thereof Between Domains In step 4), the delivery of the content of Table 4 to the PoC XDMS of the example2.com domain may be implemented either by an HTTP PUT request or by an XDM forward request. Following Tables 6 and 7 show examples where the delivery method is implemented either by the HTTP PUT request or by the XDM forward request, respectively. Table 6 illustrates a method for delivering the target XML document or the filtered part thereof between domains by using the HTTP PUT request. Table 7 illustrates a method for delivering the target XML document or the filtered part thereof between domains by using the XDM forward request.

TABLE 6

PUT http://xcap.example2.com/org.openmobilealliance.poc/users/
    sip:user@example2.com/source-poc-
    group[forwarder@example.com].xml HTTP/1.1
Host: xcap.example2.com
User-Agent: XDM-client/OMA1.0
Date: Tue, 01 Aug 2006 17:00:05 GMT+9
X-XCAP-Asserted-Identity: "sip:forwarder@example.com"
Content-Type: application/vnd.oma.poc.groups+xml
Content-Length: (. . .)
<?xml version="1.0" encoding="UTF-8"?>
<group xmlns="urn:oma:xml:poc:list-service"↓
    xmlns:rl="urn:ietf:params:xml:ns:resource-lists"↓
    xmlns:cr="urn:ietf:params:xml:ns:common-policy"↓
    xmlns:ocr="urn:oma:xml:xdm:common-policy">
    <list-service uri="sip:my_pocgroup@example.com">
        <list>
            <entry uri="tel:+43012345678"/>
            <entry uri="tel:+82254651154"/>
            <entry uri="sip:cherryblossom@example.com"/>
            <entry uri="sip:jay@other.domain.com"/>
        </list>

TABLE 6-continued

</list-service>
    </group>

TABLE 7

POST http://xcap.example2.com/org.openmobilealliance.poc/
forward HTTP/1.1
Host: xcap2.example.com
User-Agent: XDM-client/OMA1.0
Date: Tue, 01 Aug 2006 17:00:05 GMT+9
X-XCAP-Asserted-Identity: "sip:forwarder@example.com"
Content-Type: application/vnd.oma.forward+xml
Content-Length: (. . .)
<?xml version="1.0" encoding="UTF-8"?>
<forward id="123" xmlns="urn:oma:xml:xdm:forward">
    <!-- Instead of XCAP URI, the filteted contents of the target XML
        document to be XDM Forwarded is directly specified -->
    <target appid="org.openmobilealliance.poc">
        <![CDATA[
<?xml version="1.0" encoding="UTF-8"?>
<group xmlns="urn:oma:xml:poc:list-service"↓
    xmlns:rl="urn:ietf:params:xml:ns:resource-lists"↓
    xmlns:cr="urn:ietf:params:xml:ns:common-policy"↓
    xmlns:ocr="urn:oma:xml:xdm:common-policy">
    <list-service uri="sip:my_pocgroup@example.com">
        <list>
            <entry uri="tel:+43012345678"/>
            <entry uri="tel:+82254651154"/>
            <entry uri="sip:cherryblossom@example.com"/>
            <entry uri="sip:jay@other.domain.com"/>
        </list>
    </list-service>
</group>
        ]]>
    </target>
    <!-- List of recipients of XDM Forward -->
    <recipients>
        <recipient>sip:user@example2.com</recipient>
    </recipients>
    <!-- Note that there's no need for filter description anymore because
        the filtered content is already included under <target> in the
        above -->
</forward>

In the method using the HTTP PUT request as shown in Table 6, the corresponding filtered content of a PoC group document is requested to be directly stored in the user directory of the user of "sip:user@example2.com" within the PoC XDMS of the example2.com domain. Herein, any file name to be stored can be used. In the present invention, in order to prevent the file name to be stored from colliding with an existing file name, "source-poc-group [forward@example.com]" obtained by adding the id of the XDM forward request to the original XML document file name is used an example.

In the method using the XDM forward request as shown in Table 7, a URI for an XDM forward processing engine and a URI for the PoC XDMS of the exmaple2.com domain to which the request is to be delivered are recorded in a request line, and the filtered content of an XML document instead of the XCAP URI of a target XML document is directly recorded in a <target> element. Therefore, a <forward-filter-set> is not needed any more. The XDM forward receiving user of the example2.com domain to which the request is to be delivered (i.e. a user of "sip:user@example2.com") is recorded in a <recipients>.

In this case, both of the two methods require that the information of the XDM forward requesting user should be contained through an "X-XCAP-Asserted-Identity" or a corresponding HTTP header. This is because the request of the XDM forward requesting user is performed by the PoC XDMS of the example.com domain instead of the XDMS of the another domain, and the information of the XDM forward requesting user is used as a basis for determination of the receiver authorization.

The PoC XDMS of the example2.com domain receives this request, determines if the user of "sip:user@example2.com" wants to accept the content of the delivered PoC group document, and then stores the delivered content. This is identical to an existing receiver authorization.

4. Implementation of Receiver Authorization

As described in step 5), a process for determining if the XDM forward receiving user accepts the XDM forwarded content is called the receiver authorization. A method for performing the process includes proactive authorization and reactive authorization.

In the reactive authorization, the XDMS directly inquires of the XDM forward receiving user so as to determine if the XDM forward receiving user accepts a corresponding content at the time of the XDM forward generation.

In the proactive authorization, the access permission rule as to whether the XDM forward receiving user accepts the XDM forwarded content is recorded according to [XDM2_Core] (Reference: "XML Document Management (XDM) Specification", Version 2.0, Open Mobile Alliance™, OMA-TS-XDM_CORE-V2_0, URL:http://www.openmobilealliance.org/), and then is stored in the XDMS. When the XDM forward is actually generated, the XDMS determines if the XDM forward receiving user can accept the XML document according to the pre-recorded access permission rule, instead of directly inquiring of the XDM forward receiving user so as to determine if the XDM forward receiving user accepts the XDM forward. In this case, selectively, the XDMS sends a result of the proactive authorization to the XDM forward receiving user, thereby reporting which contents of the XDMS have been newly XDM-forwarded to a corresponding receiver.

Hereinafter, a method using the XCAP GET request, which is a second method of the methods for implementing the XDM forward function, will be described.

The present invention proposes an XDM system for using an XCAP GET request so that the XDM forward request can be implemented and processed as follows.

A content recorded by means of the XCAP GET request is identical to that recorded by means of the HTTP POST request mentioned in "1. Implementation of the XDM forward request", which is the first method among the methods for implementing the XDM forward function, with only a slight difference between the XDM forward function and the HTTP POST request in relation to the description method.

Table 8 below shows that the example of the XDM forward request implemented by the HTTP POST request as shown in Table 3 is modified according to the XCAP GET request.

TABLE 8

GET http://xcap.example.com/org.openmobilealliance.poc/users/
    sip:source_user@example.com/source-poc-group.xml HTTP/1.1
Host: xcap.example.com
User-Agent: XDM-client/OMA1.0
Date: Tue, 01 Aug 2006 17:00:01 GMT+9
X-XCAP-Asserted-Identity: "sip:forwarder@example.com"
X-XCAP-Forward-to: "sip:recipient_1@example.com",
    "sip:recipient_2@example.com",
    "sip:forward_group@example.com", "sip:user@example2.com"
Content-Type: application/vnd.oma.forward-filter+xml
Content-Length: (. . .)

TABLE 8-continued

<?xml version="1.0" encoding="UTF-8"?>
<!-- Filter rules to be applied to the target XML document when
    XDM Forwarded -->
<forward-filter-set xmlns="urn:oma:xml:xdm:forward-filter">
    <!-- Namesapce binding -->
    <ns-bindings>
        <ns-binding prefix="poc" urn="urn:oma:xml:poc:list-service"/>
        <ns-binding prefix="cr" urn="urn:ietf:params:xml:ns:common-
policy"/> </ns-bindings>
    <!-- 'xyz' filter rule -->
    <forward-filter id="xyz">
        <exclude type="xpath">
            /poc:group/poc:list-service/poc:invite-members
        </exclude>
        <exclude type="xpath">
            /poc:group/poc:list-service/cr:ruleset
        </exclude>
    </forward-filter>
    <!-- 'abc' filter rule -->
    <forward-filter id="abc" recipient="sip:recipient_2@example.com">
        <exclude type="xpath">
            /poc:group/poc:list-service/poc:list/poc:entry[@uri=
"sip:cherryblosson@example.com"] </exclude>
    </forward-filter>
</forward-filter-set>

As can be seen from Table 8, in contrast to a method using the HTTP POST request the above mentioned in "1. Implementation of the XDM forward request", the method using the XCAP GET request is based on the fact that an XCAP URI of a target XML document of a XDM forward and XDM forward receiving users to which they are to be delivered are not recorded in a content body in XML, but the XCAP URI of the target XML document to be XDM-forwarded is recorded in a request line of an HTTP GET request, and users to which the XDM forward are to be delivered are recorded in a new HTTP header (referred to as 'X-XCAP-Forward-to' for description convenience of the present invention). However, an ID of the XDM forward requesting user and an XDM forward filter are recorded by means of the same method as the method using the HTTP POST request mentioned in "1. Implementation of the XDM forward request". That is, the ID of the XDM forward requesting user is recorded in the "X-XCAP-Asserted-Identity" or a corresponding HTTP header, and the XDM forward filter is recorded in the content body through the XML having the <forward-filter-set> as a root element.

The XDMS having received the XDM forward request implemented by the XCAP GET request can determine that the request is not a general XCAP GET request, but is an XDM forward request through the existence of the X-XCAP-Foward-to header. Then, by using the HTTP POST request, the XDMS performs the same processes as those of the method for implementing the XMD forward (including "2. the processing of the XDM forward request," "3. the method for delivering target XML document or a filtered content between domains" and "4. the implementation of the receiver authorization").

Now, a method using the XCAP PUT request directly containing a target of the XDM forward, which is a third method among the methods for implementing the XDM forward function, will be described.

The present invention proposes a method for implementing the XDM forward function by directly containing an XML document being the XDM target or a content thereof in an XCAP PUT request.

In the third method, a target XML document or a modified content thereof instead of the XCAP URI of the target XML document is directly contained within an XCAP PUT request, in contrast to the above-described first and second methods among the methods for implementing an XDM forward function. Therefore, when the XDM forward requesting user has not already possessed a target XML document, the XDM forward requesting user must retrieve a corresponding XML document through the XCAP GET request. Then, a corresponding XML document to be XDM forwarded or contents thereof is directly recorded within an XCAP PUT request.

In the third implementation method, there is no requirement of the XDM forward filter, since contents to be XDM forwarded are directly contained in the XCAP PUT request by the XDM forward requesting user, in contrast to the first and second implementation methods among methods for implementing the XDM forward function.

Table 9 below shows an example where the XDM forward requesting user retrieves the PoC group document shown in Table 1, and then performs an XDM forward function by containing only a desired part of the retrieved PoC group document to be delivered in the XCAP PUT request. Herein, the desired part of the retrieved PoC group document to be delivered is identical to the content to which the 'xyz' XDM forward filter of Table 3 is applied.

TABLE 9

PUT http://xcap.example.com/org.openmobilealliance.poc/users/
    sip:recipient_1@example.com/source-poc-
    group[forwarder@example.com].xml HTTP/1.1
Host: xcap.example.com
User-Agent: XDM-client/OMA1.0
Date: Tue, 01 Aug 2006 17:00:05 GMT+9
X-XCAP-Asserted-Identity: "sip:forwarder@example.com"
Content-Type: application/vnd.oma.poc.groups+xml
Content-Length: (. . .)
<?xml version="1.0" encoding="UTF-8"?>
<group xmlns="urn:oma:xml:poc:list-service"↓
    xmlns:rl="urn:ietf:params:xml:ns:resource-lists"↓
    xmlns:cr="urn:ietf:params:xml:ns:common-policy"↓
    xmlns:ocr="urn:oma:xml:xdm:common-policy">
    <list-service uri="sip:my_pocgroup@example.com">
        <list>
            <entry uri="tel:+43012345678"/>
            <entry uri="tel:+82254651154"/>
            <entry uri="sip:cherryblossom@example.com"/>
            <entry uri="sip:jay@other.domain.com"/>
        </list>
    </list-service>
</group>

As can be seen Table 9, according to this implementation method, both a user directory within the XDMS of the XDM forward receiving user in which the delivered content is to be stored and a file name of the delivered content to be stored are directly designated in a request line of an XCAP PUT request. Any file name can be used. Herein, the file name is expressed by adding an ID of an XDM forward requesting user to an original XML document. As can be seen from FIG. 11, the XDM forward request by using the XCAP PUT is directly routed to an XDMS in which a target XML document or a content thereof is to be stored, in contrast to the first and second implementation methods among methods for implementing the XDM forward function.

Moreover, in the XCAP PUT request, it is impossible to perform an XDM forwarding to a plurality of users or a group since a user directory of a particular XDM forward receiving user must be recorded in a request line of the XCAP PUT request, in contrast to the first and second implementation methods among methods for implementing an XDM forward function.

Figure 11:
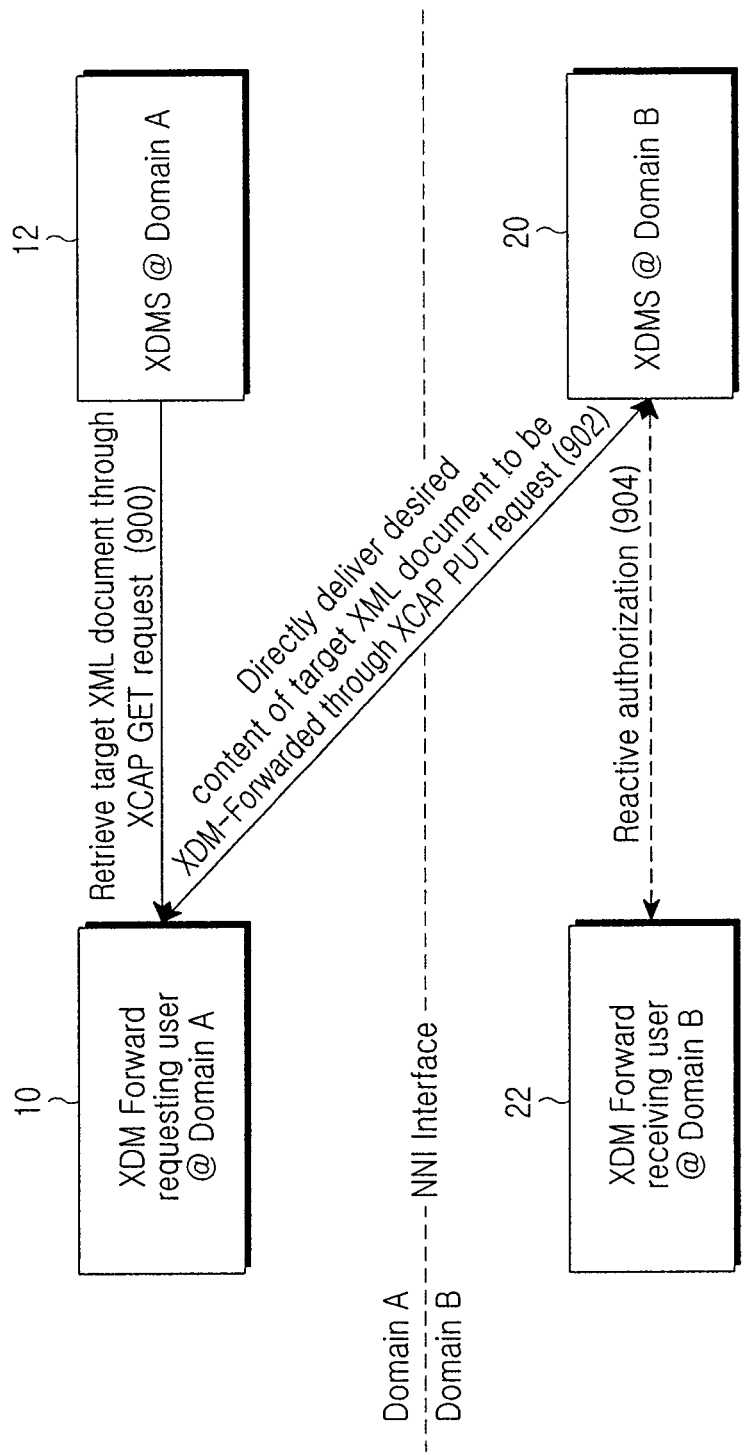
FIG. 11 is a view showing a process flow of a case where an XDM forward function is implemented by using an XCAP PUT request directly containing a XDM forward target, according to an embodiment of the present invention.

A general processing of the XDM forward request implemented in this manner can be made as shown in FIG. 11. That is, when the XDM forward requesting user 10 of the domain A does not possess the XML document to be XDM-forwarded, the XDM forward requesting user 10 retrieves a corresponding XML document from the XDMS 12 of the domain A, directly contains a desired content to be forwarded in a body of the XCAP PUT request based on the retrieved XML document, and directly delivers the content to a desired XDMS 20 of the domain B to be forwarded. The XDMS 20 of the domain B determines if the XDM forward receiving user 22 can accept the forwarded content, and then stores the forwarded content in the XDMS 20.

In the third implementation method, it is difficult to perform the requestor authorization for this user since the XDM forward requesting user directly retrieves a corresponding content through the XDMS and contains the retrieved content in the XCAP PUT request, in contrast to the first and second implementation methods. This is because when the XDM forward requesting user retrieves a corresponding XML document through the XCAP GET request, it is checked if this user has been granted only an authorization to retrieve such an XML document. Therefore, even though the user performs the XDM forward of a retrieved XML document after the user retrieves a corresponding XML document, it is impossible to perform the requestor authorization for determining if the user can perform an XDM forward of a corresponding XML document.

As described above, the XDM forward request through such an XCAP PUT request is directly delivered to an XDMS where a target is to be stored. Since contents within a content body are directly requested to be generated by the request, the XDMS treats and processes the request in the same manner as the general XCAP PUT request. Therefore, according to this implementation method, the receiver authorization for the XDM forward request is performed in the same manner as the receiver authorization for the XDM forward requesting user.

Finally, a method for implementing an XDM forward request by using the XCAP PUT request containing the XCAP URI of the XDM forward target, which is a fourth method among methods for implementing an XDM forward function, will be described.

The present invention proposes a method for implementing an XDM forward function by containing the XCAP URI of the XML document being the XDM forward target in the XCAP PUT request.

The above-described fourth implementation method is identical to the third method among the above mentioned methods for implementing an XDM forward function in terms of using the XCAP PUT request. However, the fourth implementation method has a difference in that only an XCAP URI of the target XML document through the target XML document is indirectly recorded in the same manner as the first and second implementation methods, instead of directly recording the target XML document in the direct XCAP PUT request.

In the fourth implementation method as described above, the XML document is indirectly recorded by using the XCAP URI. Therefore, in the fourth implementation method also, the XDM forward filter can be recorded in the same manner as in the first and second implementation methods.

Tables 10, 11, and 12 show examples of the XMD forward request implemented in this manner.

TABLE 10

PUT http://xcap.example.com/org.openmobilealliance.poc/users/
    sip:recipient_1@example.com/
    source-poc-group[forwarder@example.com].xml HTTP/1.1
Host: xcap.example.com
User-Agent: XDM-client/OMA1.0
Date: Tue, 01 Aug 2006 17:00:05 GMT+9
X-XCAP-Asserted-Identity: "sip:forwarder@example.com"
Content-Type: message/external-body;
    ACCESS-TYPE=URL;
    URL="http://xcap.example.com/org.openmobilealliance.poc/users/
    sip:source_user@example.com/source-
    poc-group.xml";
    size=...
Content-Length: (...)
Content-Type: application/vnd.oma.poc.groups+xml

TABLE 11

PUT http://xcap.example.com/org.openmobilealliance.poc/users/
    sip:recipient_1@example.com/
    source-poc-group[forwarder@example.com].xml HTTP/1.1
Host: xcap.example.com
User-Agent: XDM-client/OMA1.0
Date: Tue, 01 Aug 2006 17:00:05 GMT+9
X-XCAP-Asserted-Identity: "sip:forwarder@example.com"
Content-Type: multipart/mixed; boundary=zz993453
--zz993453
Content-Type: message/external-body;
    ACCESS-TYPE=URL;
    URL="http://xcap.example.com/org.openmobilealliance.poc/users/
    sip:source_user@example.com/source-poc-group.xml";
    size=
Content-Length: (...)
Content-Type: application/vnd.oma.poc.groups+xml
Content-Description: XCAP URI of the target PoC Group XML
document to be XDM Forwarded
--zz993453
Content-Type: application/vnd.oma.foward-filter+xml
Content-Length: (. . .)
<?xml version="1.0" encoding="UTF-8"?>
<!-- Filter rules to be applied to the target XML document
when XDM Forwarded -->
<forward-filter-set xmlns="urn:oma:xml:xdm:forward-filter">
    <!-- Namesapce binding -->
    <ns-bindings>
        <ns-binding prefix="poc" urn="urn:oma:xml:poc:list-service"/>
        <ns-binding prefix="cr" urn=
" urn:ietf:params:xml:ns:common-policy"/> </ns-bindings>
    <!-- 'xyz' filter rule -->
    <forward-filter id="xyz">
        <exclude type="xpath">
            /poc:group/poc:list-service/poc:invite-members
        </exclude>
        <exclude type="xpath">
            /poc:group/poc:list-service/cr:ruleset
        </exclude>
    </forward-filter>
</forward-filter-set>
--zz993453

TABLE 12

PUT http://xcap.example.com/org.openmobilealliance.poc/users/
    sit:recipient_1@example.com/
    source-poc-group[forwarder@example.com].xml HTTP/1.1
Host: xcap.example.com
User-Agent: XDM-client/OMA1.0
Date: Tue, 01 Aug 2006 17:00:05 GMT+9
X-XCAP-Asserted-Identity: "sip:forwarder@example.com"
X-XCAP-Foward-Target: "http://xcap.example.com/
    org.openmobilealliance.poc/users↓
    /sip:source_user@example.com/source-poc-group.xml"
Content-Type: application/vnd.oma.foward-filter+xml
Content-Length: (. . .)
<?xml version="1.0" encoding="UTF-8"?>

TABLE 12-continued

<!-- Filter rules to be applied to the target XML document when XDM
Forwarded -->
<forward-filter-set xmlns="urn:oma:xml:xdm:forward-filter">
    <!-- Namesapce binding -->
    <ns-bindings>
        <ns-binding prefix="poc" urn="urn:oma:xml:poc:list-service"/>
        <ns-binding prefix="cr" urn=
" urn:ietf:params:xml:ns:common-policy"/>
    </ns-bindings>
    <!-- 'xyz' filter rule -->
    <forward-filter id="xyz">
        <exclude type="xpath">
            /poc:group/poc:list-service/poc:invite-members
        </exclude>
        <exclude type="xpath">
            /poc:group/poc:list-service/cr:ruleset
        </exclude>
    </forward-filter>
</forward-filter-set>

Table 10 shows an example in which the XDM forward request is implemented by using the XCAP PUT request containing an XCAP URI of the XML document being a target of the XDM forward. Table 11 shows an example in which an XDM forward request is implemented by using an XCAP URI of the XML document being the XDM forward target and an XDM forward filter therefor. Further, Table 12 shows an example in which the XDM forward request is implemented by using the XCAP PUT request containing the XCAP URI of the XML document being the XDM forward target and the XDM forward filter therefore, and another example in which the XCAP URI is recorded through a new HTTP header.

In Tables 10 and 11, the XCAP URI of the XML document within the XCAP PUT request is contained by using a "message/external-body content type" defined in [RFC2017] (Reference: "Definition of the URL MIME External-Body Access-Type", N. Freed, et. al., RFC 2017, October 1996, URL: http://www.ietf.org/rfc/rfc2017.txt) and [RFC4483] (Reference: "A Mechanism for Content Indirection in Session Initiation Protocol (SIP Messages)", E. Burger, Ed., RFC 4483, May 2006, URL: http://www.i-etf.org/rfc/rfc4483.txt). Moreover, the XDM forward filter for the target XML document may be recorded together with a "message/external-body" content type by using a "multi-part/mixed" content type as shown in Table 11.

As shown in Table 12, the XCAP URI of the target XML document may be recorded by using a new HTTP header and the XDM forward filter therefor may be recorded by using a body of the XCAP PUT request.

In the fourth implementation method, a user directory within an XDMS of the XDM forward receiving user in which the delivered content is to be stored and the file name thereof are directly designated in the same manner as the third implementation method among methods for implementing the above-mentioned XDM forward functions. Any file name can be used. Herein, the file name is expressed by adding an ID of an XDM forward requesting user to an original XML document. Therefore, as in the case of the third implementation method, the XDM forward request is directly routed to an XDMS in which a target XML document or the content thereof is to be stored.

Therefore, in the XCAP PUT request, a user directory of a particular XDM forward receiving user must be recorded in a request line of the XCAP PUT request in the same manner as the third implementation method, so that it is impossible to perform an XDM forward to a plurality of users or a group, differently from the first and second implementation methods.

Figure 12:
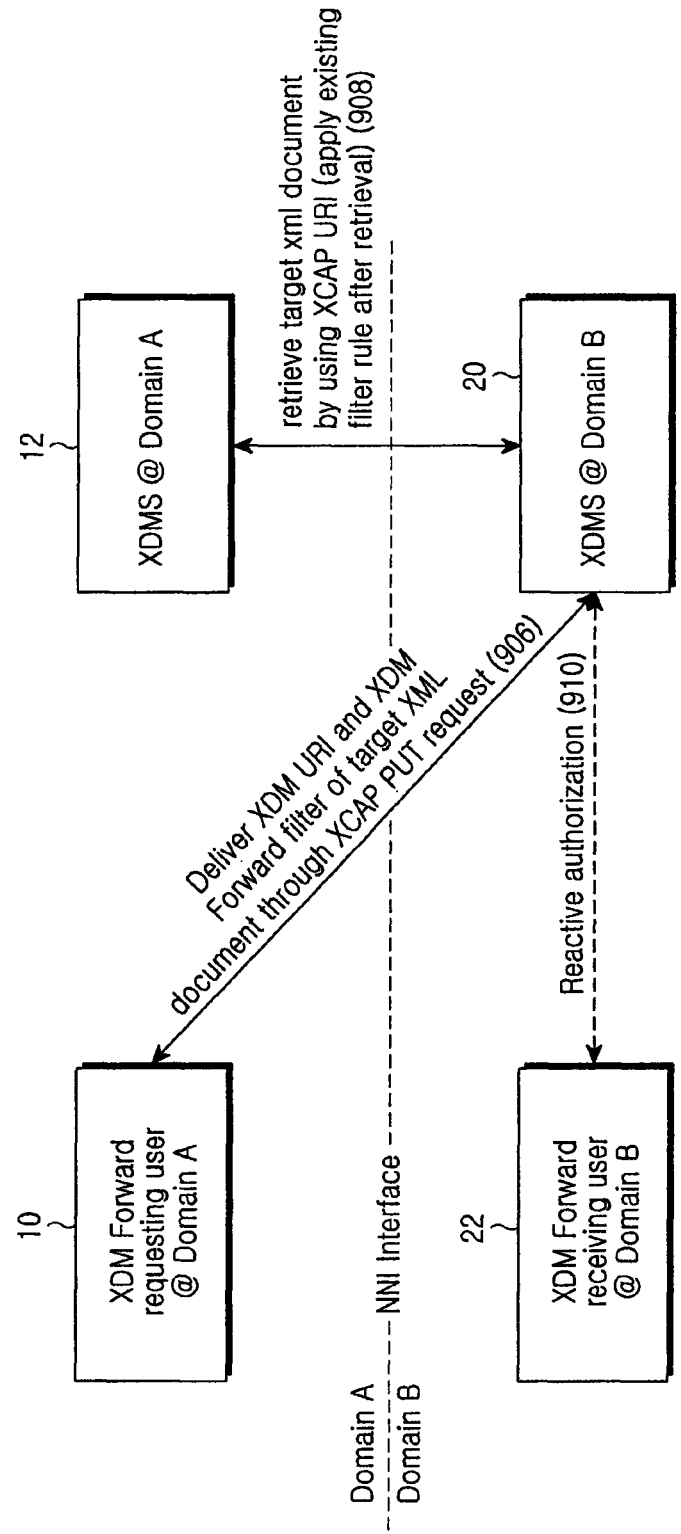
FIG. 12 is a view showing a process flow of a case where an XDM forward function is implemented by using an XCAP PUT request containing an XCAP URI of an XDM forward target according to an embodiment of the present invention.

A general processing of the XDM forward request implemented in this manner can be made as shown in FIG. 12. That is, an XDM forward request implemented by an XCAP PUT request containing an XCAP URI and an XDM forward filter of a target XML document is directly delivered to the XDMS 20 of the domain B, which is an XDMS in which the XDM-forwarded content is to be stored. The XDMS 20 retrieves a target XML document from the XDMS 12 of the domain A through the XCAP GET request using the XCAP URI and then applies an XDM forward filter to the retrieved XML document when there is the XDM forward filter. Then, the XDMS 20 determines if the XDM forward receiving user 22 can accept a filtered content of a target XML document and stores the accepted content in the XDMS 20.

In this implementation method, there may be a problem in that information security maintenance of the XDM forward requesting user 10, since the XDM forward filtering rule is directly delivered to the XDMS 20 of the XDM forward receiving user 22 or the XDMS 20 directly retrieves a target XML document from the XDMS 12 of the XDM forward requesting user, as described for the methods for routing the XDM forward request with reference to FIGS. 6 and 7.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A server for managing and forwarding an eXtensible Markup Language (XML) document, the server comprising:
   a memory; and
   a processor configured to:
   receive a forward request message, from a first client, that requests forwarding of a target XML document;
   perform receiver authorization for determining whether each of a second client and a third client accepts forwarding of the target XML document, wherein the forward request message indicates that the target XML document is to be forwarded to each of the second client and the third client; and
   forward the target XML document by storing the target XML document in each of directories of the second client and the third client when each of the second client and the third client accepts the forwarding of the target XML document,
   wherein the processor is further configured to perform the receiver authorization by performing each of proactive authorization and reactive authorization,
   wherein, when performing the proactive authorization, the processor is configured to determine whether the third client accepts forwarding of the target XML document, without directly inquiring of the third client, according to an access rule which has been defined by the third client and has been stored in the server, and
   wherein, when performing the reactive authorization, the processor is configured to inquire of the second client, and receive, from the second client, a response associated with whether the second client accepts the forwarding of the target XML document.

2. The server of claim 1, wherein the processor is further configured to determine whether the first client has been granted an authority to modify the target XML document when the forward request message contains a request to modify the target XML document, modify the target XML document when the first client has been granted the authority to modify the target XML document, and store a modified target XML document in each of the directories of the second client and the third client.

3. The server of claim 1, wherein, when the forward request message comprises a filter rule, the processor is configured to determine whether the first client has been granted an authority to modify the target XML document, apply the filter rule to the target XML document when the first client has been granted the authority to modify the target XML document, and store a part of the target XML document corresponding the filter rule in each of the directories of the second client and the third client.

4. The server of claim 1, wherein the processor is further configured to transmit a forward execution result to the first client.

5. The server of claim 1, wherein the forward request message comprises storage location information corresponding to the target XML document, and
   the processor is further configured to retrieve the target XML document based on the storage location information.

6. The server of claim 5, wherein the storage location information is an XML Configuration Access Protocol (XCAP) Uniform Resource Identifier (URI) corresponding to the target XML document.

7. The server of claim 1, wherein the processor is further configured to determine whether the first client has been granted an authority to forward the target XML document.

8. A method for forwarding an eXtensible Markup Language (XML) document in a server for managing XML documents, the method comprising the steps of:
   receiving a forward request message, from a first client, that requests forwarding of a target XML document;
   performing receiver authorization for determining whether each of a second client and a third client accepts forwarding of the target XML document, wherein the forward request message indicates that the target XML document is to be forwarded to each of the second client and the third client; and
   forwarding the target XML document by storing the target XML document in each of directories of the second client and the third client, when each of the second client and the third client accepts the forwarding of target XML document,
   wherein the receiver authorization is performed by performing each of proactive authorization and reactive authorization,
   wherein performing the proactive authorization includes determining whether the third client accepts forwarding of the target XML document, without directly inquiring of the third client, according to an access rule which has been defined by the third client and has been stored in the server, and
   wherein performing the reactive authorization includes inquiring of the second client, and receiving, from the second client, a response associated with whether the second client accepts the forwarding of the target XML document.

9. The method of claim 8, further comprising the steps of:
   determining whether the first client has been granted an authority to modify the target XML document, when the forward request message comprises a request to modify the target XML document;
   modifying the target XML document, when the first client has been granted the authority to modify the target XML document; and
   storing a modified target XML document in each of the directories of the second client and the third client.

10. The method of claim 8, further comprising the steps of
- determining whether the first client has been granted an authority to modify the target XML document, when the forward request message includes a filter rule for forwarding a part of the target XML document;
- applying the filter rule to the target XML document, when the first client has been granted the authority to modify the target XML document; and
- storing the part of the target XML document corresponding the filter rule in each of the directories of the second client and the third client.

11. The method of claim 8, wherein the forward request message comprises storage location information corresponding to the target XML document, and
- the method further comprises retrieving the target XML document based on the storage location information.

12. The method of claim 11, wherein the storage location information is an XML Configuration Access Protocol (XCAP) Uniform Resource Identifier (URI) corresponding to the target XML document.

13. The method of claim 8, wherein the method further comprises determining whether the first client has been granted an authority to forward the target XML document.

14. A non-transitory computer-readable storage medium with instructions stored therein which, upon execution, cause at least one processor to:
- receive a forward request message, from a first client, that requests forwarding of a target XML document;
- perform receiver authorization for determining whether each of a second client and a third client accepts forwarding of the target XML document, wherein the forward request message indicates that the target XML document is to be forwarded to each of the second client and the third client; and
- forward the target XML document by storing the target XML document in each of directories of the second client and the third client when each of the second client and the third client accepts the forwarding of target XML document,
- wherein the instructions further cause the at least one processor to perform the receiver authorization by performing each of proactive authorization and reactive authorization,
- wherein, when performing the proactive authorization, the at least one processor is configured to determine whether the third client accepts the forwarding of the target XML document, without directly inquiring of the third client, according to an access rule which has been defined by the third client and has been stored in the server, and
- wherein, when performing the reactive authorization, the at least one processor is configured to inquire of the second client, and receive, from the second client, a response associated with whether the second client accepts the forwarding of the target XML document.

15. The non-transitory computer-readable storage medium of claim 14, wherein the instructions further cause the at least one processor to:
- determine whether the first client has been granted an authority to modify the target XML document, when the forward request message comprises a request to modify the target XML document;
- modify the target XML document, when the first client has been granted the authority to modify the target XML document; and
- store a modified target XML document in each of the directories of the second client and the third client.

16. The non-transitory computer-readable storage medium of claim 14, wherein the instructions further cause the at least one processor to:
- determine whether the first client has been granted an authority to modify the target XML document, when the forward request message includes a filter rule for forwarding a part of the target XML document;
- apply the filter rule to the target XML document, when the first client has been granted the authority to modify the target XML document; and
- store the part of the target XML document corresponding the filter rule in each of the directories of the second client and the third client.

17. The non-transitory computer-readable storage medium of claim 14, wherein the instructions further cause the at least one processor to:
- transmit a forward execution result corresponding to the forward request message to the first client.

18. The non-transitory computer-readable storage medium of claim 14, wherein the forward request message comprises storage location information corresponding to the target XML document, and
- wherein the instructions further cause the at least one processor to retrieve the target XML document based on the storage location information.

19. The non-transitory computer-readable storage medium of claim 18, wherein the storage location information is an XML Configuration Access Protocol (XCAP) Uniform Resource Identifier (URI) corresponding to the target XML document.

20. The non-transitory computer-readable storage medium of claim 14, wherein the instructions further cause the at least one processor to:
- determine whether the first client has been granted an authority to forward the target XML document.

* * * * *